US009834028B2

(12) United States Patent
Degott et al.

(10) Patent No.: US 9,834,028 B2
(45) Date of Patent: Dec. 5, 2017

(54) OPTICAL EFFECT LAYER

(71) Applicant: SICPA HOLDING SA, Prilly (CH)

(72) Inventors: Pierre Degott, Crissier (CH); Mathieu Schmid, Lausanne (CH); Claude Alain Despland, Prilly (CH); Cedric Amerasinghe, Les Cullayes (CH)

(73) Assignee: SICPA HOLDING SA, Prilly (CH)

( * ) Notice: Subject to any disclaimer, the term of this patent is extended or adjusted under 35 U.S.C. 154(b) by 11 days.

(21) Appl. No.: 14/399,325

(22) PCT Filed: Apr. 30, 2013

(86) PCT No.: PCT/EP2013/058986
§ 371 (c)(1),
(2) Date: Nov. 6, 2014

(87) PCT Pub. No.: WO2013/167425
PCT Pub. Date: Nov. 14, 2013

(65) Prior Publication Data
US 2015/0146280 A1    May 28, 2015

(30) Foreign Application Priority Data
May 7, 2012 (EP) .................................... 12003551

(51) Int. Cl.
*G02F 1/00* (2006.01)
*B32B 5/16* (2006.01)
(Continued)

(52) U.S. Cl.
CPC .............. *B42D 25/20* (2014.10); *B05D 3/20* (2013.01); *B05D 5/06* (2013.01); *B05D 5/065* (2013.01);
(Continued)

(58) Field of Classification Search
CPC ............. B05D 3/00; B05D 5/06; B42D 15/00
(Continued)

(56) References Cited

U.S. PATENT DOCUMENTS

| 4,838,648 | A | 6/1989 | Phillips et al. |
| 8,343,615 | B2* | 1/2013 | Raksha ................... G02B 5/09 |
| | | | 428/195.1 |

(Continued)

FOREIGN PATENT DOCUMENTS

| EP | 0556449 | 8/1993 |
| EP | 686675 | 12/1995 |

(Continued)

OTHER PUBLICATIONS

Taiwan Office Action in counterpart Taiwan Patent Application No. 102116048 dated Jul. 15, 2016 (and English language translation).
(Continued)

*Primary Examiner* — William Choi
(74) *Attorney, Agent, or Firm* — Greenblum & Bernstein, P.L.C.

(57) ABSTRACT

The disclosure relates to the field of graphical elements and is directed to an optical effect layer (OEL), a device and a method for producing same. The disclosure provides an optical effect that is easy to detect as such and exhibits a viewing-angle dependent apparent motion of image features over an extended length if the viewing angle with respect to the OEL changes. An OEL includes a binder material being at least partially transparent and a plurality of particles dispersed within the layer. Each particle has a non-isotropic reflectivity and may be magnetic or magnetizable. The orientation of the particles forms an orientation pattern extending over a length within an extended surface of the OEL, such that the local average of an angle between (i) a straight line along an observed longest dimension within the
(Continued)

corresponding cross-section shape, and (ii) said first direction x varies according to a function (θ) of a position (P) along said first direction.

28 Claims, 19 Drawing Sheets

(51) Int. Cl.
| | |
|---|---|
| *B42D 25/20* | (2014.01) |
| *B05D 5/06* | (2006.01) |
| *B05D 3/00* | (2006.01) |
| *G02B 5/02* | (2006.01) |
| *B42D 25/29* | (2014.01) |
| *B42D 25/00* | (2014.01) |
| *C09D 11/037* | (2014.01) |
| *B42D 25/30* | (2014.01) |
| *B42D 25/40* | (2014.01) |
| *G02B 5/08* | (2006.01) |
| *G02F 1/21* | (2006.01) |

(52) U.S. Cl.
CPC ............ *B42D 25/00* (2014.10); *B42D 25/29* (2014.10); *B42D 25/30* (2014.10); *B42D 25/40* (2014.10); *C09D 11/037* (2013.01); *G02B 5/0257* (2013.01); *G02B 5/08* (2013.01); *G02F 1/0036* (2013.01); *G02F 1/21* (2013.01); *B42D 2033/16* (2013.01); *B42D 2033/18* (2013.01); *B42D 2033/20* (2013.01); *B42D 2035/20* (2013.01); *G02F 2001/213* (2013.01)

(58) Field of Classification Search
USPC ...... 359/298, 321; 428/195.1, 201, 204, 206
See application file for complete search history.

(56) References Cited

U.S. PATENT DOCUMENTS

2010/0040845 A1\* 2/2010 Schmid ................. B05D 3/207
428/207
2012/0301639 A1\* 11/2012 Grigorenko ........... B41M 3/148
428/29

FOREIGN PATENT DOCUMENTS

| EP | 2314386 | | 4/2011 |
|---|---|---|---|
| JP | 2010-506756 A | * | 3/2010 |
| WO | 02/073250 | | 9/2002 |
| WO | 02/090002 | | 11/2002 |
| WO | 03/000801 | | 1/2003 |
| WO | 2004/007095 | | 1/2004 |
| WO | 2005/002866 | | 1/2005 |
| WO | 2006/114289 | | 11/2006 |
| WO | 2007/131833 | | 11/2007 |
| WO | 2008/046702 | | 4/2008 |

OTHER PUBLICATIONS

Japanese office action in counterpart Japanese Application No. P2015-510731 dated Oct. 25, 2016 (and English language translation).

\* cited by examiner a)

b)

a)

b)

OPTICAL EFFECT LAYER

CROSS-REFERENCE TO RELATED APPLICATIONS

The present application is a U.S. National Stage of International Application No. PCT/EP2013/058986, filed Apr. 30, 2013, which published as WO 2013/167425A1 on Nov. 14, 2013, the disclosure of which is expressly incorporated by reference herein in its entirety. Further, this application claims priority under 35 U.S.C. §119 and §365 of European Application No. 12003551.4, filed May 7, 2012.

FIELD OF THE DISCLOSURE

The present disclosure relates to the field of graphical elements and is directed to an optical effect layer showing a viewing-angle dependent optical effect and a device and a method for producing the optical effect layer. In particular, one application of the optical effect layer is in the field of security elements for the protection of banknotes, passports and other documents, and for brand-protection. In addition or alternatively the optical effect layer may also be used for decorative purposes.

BACKGROUND OF THE DISCLOSURE

Security features, e.g. for security documents, can be classified into "covert" security features one the one hand, and "overt" security features on the other hand. The protection provided by covert security features relies on the concept that such features are difficult to detect, typically requiring specialized equipment and knowledge for detection, "overt" security features rely on the concept of being easily detectable with the unaided human senses, e.g. such features may be visible and/or detectable via the tactile sense, while still being difficult to produce and/or to copy. However, the effectiveness of overt security features depends to a great extent on their easy recognition as a security feature, because most users, and particularly those having no prior knowledge of the security features of a therewith secured document or item, will only then actually perform a security check based on said security feature if they have actual knowledge of their existence and nature.

It is known in the art to use inks containing magnetically orientable pigments, particularly also magnetic optically variable pigments, for the production of overt security elements, e.g. in the field of security documents.

WO 2005/002866 A1, for example, discloses improved optically variable printed security elements, comprising a high-resolution image represented by oriented optically variable magnetic pigment particles in a hardened coating layer. Said high-resolution image is produced in a printing process, using a particular magnetic orienting device. The security document is first imprinted with a coating composition comprising magnetic or magnetizable particles, such as optically variable magnetic pigment flakes. The imprinted document is subsequently exposed, while the coating is still "wet", to the magnetic field of the magnetic orienting device, comprising a magnetized permanent-magnetic plate engraved with indicia. The magnetic or magnetizable particles of the coating are oriented under the influence of the magnetic field of the orienting device, hereby forming an image of said engraved indicia. The coating is subsequently hardened, so as to "freeze" the magnetic or magnetizable particles in their positions and orientations.

Optically variable magnetic pigments which can be used for this purpose have been disclosed for example in U.S. Pat. No. 4,838,648 and in EP 686,675 B1. Corresponding inks and coating compositions have been disclosed in WO 2007/131833 A1.

WO 2008/046702 A1 discloses further types of magnetically induced images produced through the orientation of optically variable magnetic pigment particles in a coating layer, as well as a device for producing said types of images. The device comprises the combination of a magnetized permanent-magnetic plate engraved with indicia with one or more additional magnets mounted with respect to the engraved magnetic plate such as to hold them against the inherent magnetic forces occurring between them.

WO 2004/007095 A2 discloses a device for orienting magnetic pigment flakes in a coating layer exposed to the magnetic field of one or more dipole magnets, to produce aesthetically appealing, bright optically variable coatings, which, albeit flat, show a smooth variation of color and reflectivity with changing viewing angle, which is reminiscent of a floating or moving three-dimensional object. Particularly noteworthy, the device of WO 2004/007095 allows for orienting magnetic pigment flakes in a coating layer so as to produce a "rolling-bar" effect in the resulting coating. A printed "rolling bar" type image shows a contrasting band which appears to move ("roll") as the image is tilted, and which can be obtained with a single printing step and using a single ink formulation. Printed elements which exhibit an apparent motion of image features with changing viewing angle, such as a "rolling-bar" type effect, are anti-copy protection measures for security documents, which can be easily recognized and used for the authentication of a security document. The device of WO 2004/007095, however, may show the drawback that useful "rolling-bar" type effects can only be produced over a relatively small length, and might thus be often difficult to recognize as a security feature.

This is illustrated in FIGS. 1a and 1b, which each schematically show a dipole magnet DM generating a magnetic dipole field, and a substrate S positioned within said magnetic field on one side of and at a distance d from the magnet DM and essentially parallel to its magnetic axis, i.e., the virtual line between its magnetic north pole and south pole. The dipole magnet in FIG. 1a has a longer extension L along its magnetic axis than the dipole magnet in FIG. 1b along its respective magnetic axis. In both cases, reflective particles, e.g. pigment particles, are provided dispersed within a layer of liquid binder material on top of the substrate S and are oriented by the magnetic field, typically such that the respective longest extension of each particle is substantially aligned with the field lines of the magnetic field at the position of the particle. As can be seen by comparing FIGS. 1a and 1b, the dipole magnet used in the device for orienting the particles in a corresponding layer on a substrate S must have at least the length L over which the "rolling-bar" effect is to be produced. The long dipole magnet DM shown in FIG. 1a has only weakly curved field lines at the location of the substrate S, whereas the short dipole magnet DM shown in FIG. 1b has field lines having a higher degree of curvature at the location of the substrate S. As a consequence, the resulting "rolling-bar" print in case of the long magnet of FIG. 1a shows a large bright zone z, which only exhibits a slight apparent movement with changing viewing-angle, i.e. a poor and hardly eye-catching dynamic effect, whereas in comparison the resulting "rolling-bar" print in case of the short magnet of FIG. 1b shows only a small bright zone z, which however exhibits a strong apparent movement with changing viewing-angle. However, due to the rather limited length corresponding to the short dipole magnet, the security feature is not eye-catching and not easy to recognize, particularly if one does not have any prior knowledge of its presence and/or optical effect. Therefore, there remains a need for security features displaying an eye-catching dynamic optical effect over an extended length.

SUMMARY OF EMBODIMENTS OF THE DISCLOSURE

Accordingly, it is an aim of the present disclosure to provide an optical effect layer, e.g. on a document or other item, which exhibits a viewing-angle dependent apparent motion of image features over an extended length. It is particularly desirable to provide such optical effect layer as an improved easy-to-detect overt security feature, or in addition or alternatively as a covert security feature, e.g. in the field of document security. According to a further aim such optical effect layer is also suitable for decorative purposes.

The present disclosure noteworthy provides a solution to the above aims by providing an optical effect layer (hereinafter abbreviated as "OEL"), a device and a method for producing same, a security document comprising such OEL and the use of such OEL as a security feature, according to the appended claims.

In a first aspect of the disclosure, an OEL is provided which comprises a binder material being at least partially transparent to electromagnetic radiation of one or more wavelengths in the range of 200 nm to 2500 nm, i.e. within the portion of the electromagnetical spectrum which is typically referred to as the "optical spectrum". A plurality of non-spherical particles having a non-isotropic reflectivity are dispersed within said binder material and the particles are oriented according to a pattern extending over a length along a first direction within an extended surface of the optical effect layer. In a first cross-section of the optical effect layer, substantially perpendicular to the extended surface and along the first direction, the local average of an angle between: (i) a straight line along an observed longest dimension within the corresponding cross-section of those non-spherical particles that intersect with said first cross-section, and (ii) said first direction, varies according to a function $\theta$ of a position along said first direction, which is the sum of a monotonically increasing or decreasing first function $\theta_1$ of said position and an alternating second function $\theta_2$ of said position.

Overt security features based on such an improved, extended OEL are significantly more noticeable, i.e., eye-catching, than conventional "rolling bar" or related optical effects like those discussed above in connection with FIGS. 1a and 1b, where either the spatial extension of the achievable effect might be very limited or only a faint dynamic motion effect might be achievable. As a document security feature is particularly effective if it is easily perceived and/or used, the document security and/or protection against counterfeiting or illegal reproduction achievable with such improved OEL can be significantly increased, since the likelihood that the security feature will actually be (i) recognized as such by a user, (ii) used for verifying the authenticity of a thus protected document or other article, and (iii) safely distinguished from a non-authentic, i.e., fake security feature, is strongly increased. Due to its nature, the optical effect provided by the present disclosure cannot be reproduced by mere copying, for example by commercially available copying machines, and thus provides an increased security level compared to other optical effects. The improved OEL can, for example, be used as an overt security feature for security documents like bank notes or passports, or in general for any article or item such as valuable consumer products or spare parts etc., where protection matters. In addition or alternatively, the effect may be employed as a covert security feature, where the optical effect occurs (at least additionally) for wavelengths outside the visible range of the optical spectrum which may only be detected with adequate authentication equipment being sensitive to radiation in the respective non-visible portions of the spectrum. Furthermore, the optical effect, due to its dependency of the viewing angle and its increased spatial extension is also very suitable for decorative purposes, including in combination with its use as a security feature.

Put differently, and more in terms of the function $\theta$, the overall shape of the function $\theta$ is such that it is undulating or fluctuating, with its overall trend either steadily decreasing or steadily increasing as a function of the position. By the overall trend steadily decreasing or steadily increasing, it is meant that, when averaged over several fluctuations, the average of the function $\theta$ either steadily increases or steadily decreases with position. The alternating second function $\theta_2$ ensures that the function $\theta$ exhibits a plurality of positions where the derivative of $\theta$ with respect to the position is zero, i.e., where the function is, in plain language, "flat". Preferably, the function $\theta$ forms a plurality of local maxima and minima (i.e., peaks and troughs) at these "flat" positions, which lead to a patterned visual effect formed by a plurality of dark spots and a plurality of bright spots. These spots move across the optical effect layer in a directional manner when the OEL is tilted. In other words, the function $\theta$ varies such that, if the viewing angle of the optical effect layer changes, a pattern of bright and dark areas on the extended surface of the optical effect layer will appear to move along the first direction (x).

In a second aspect of the disclosure, a device for producing an optical effect layer by orienting magnetic or magnetizable particles dispersed within a binder material is provided. The device comprises an arrangement of one or more magnets, comprising a magnetized magnetic plate. The arrangement of one or more magnets is so configured as to produce a combined magnetic field comprising (a) a first magnetic field component being substantially similar to a magnetic dipole field and having its North-South direction aligned substantially parallel to said magnetized magnetic plate; and (b) a second magnetic field component that comprises a superposition of individual local dipole-like magnetic fields, and thus corresponds to an alternation of magnetic North and South poles along a first direction substantially parallel to said North-South direction. The first magnetic field component and the second magnetic field component overlap at least in an area adjacent to an extended surface of said magnetized magnetic plate, where the optical effect layer can be produced.

Therefore the device is suitable for producing an OEL according to the first aspect in cases where the particles within the binder material are magnetic or magnetizable particles.

In a third aspect of the disclosure, a method of producing an optical effect layer is provided. The method comprises exposing a fluid, i.e. not yet hardened, binder material comprising a plurality of magnetic or magnetizable non-spherical particles having a non-isotropic reflectivity and being dispersed within said binder material, to the magnetic field of a device according to the second aspect of the present disclosure in an area adjacent to an extended surface of the magnetized magnetic plate of the device. Thereby the magnetic or magnetizable non-spherical particles within the binder material are oriented. The method further comprises the concomitant or subsequent hardening of the binder material so as to fix the magnetic or magnetizable non-spherical particles in their adopted positions and orientations. The binder material is, at least in its hardened state, at least partially transparent to electromagnetic radiation of one or more wavelengths in the range of 200 nm to 2500 nm.

The method thus provides an optical effect layer according to the first aspect of the disclosure in cases where the particles within the binder material are magnetic or magnetizable particles.

In a fourth aspect, a security document comprising an optical effect layer according to the first aspect is provided.

In a fifth aspect, a use of an optical effect layer according to the first aspect of the present disclosure as a security feature or security element in document security applications is provided.

Various preferred embodiments and variants of the disclosure according to the above aspects are provided in the dependent claims.

BRIEF DESCRIPTION OF THE DRAWINGS

The disclosure is described below in detail and with reference to the drawings, wherein.

DETAILED DESCRIPTION EMBODIMENTS OF THE DISCLOSURE

I. Optical Effect Layer (OEL)

Figure 1B:
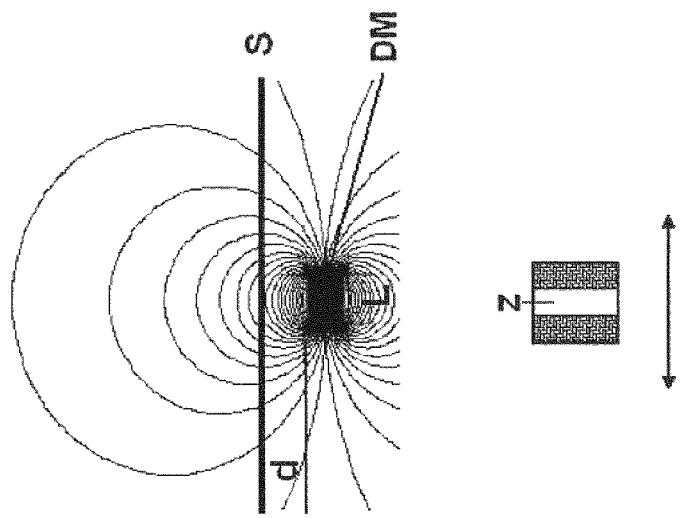
FIG. 1 schematically illustrates two optical effect layers OEL known as "rolling bar effect" of the prior art and the way in which they can be obtained: a) using a long dipole magnet, and b) using a short dipole magnet.

An optical effect layer ("OEL") according to the present disclosure comprises a binder material, and a plurality of non-randomly oriented non-spherical particles having a non-isotropic reflectivity and being dispersed within the binder material.

Throughout the present description, the term "orientation" refers to the general relationship between the coordinate system of the oriented particle and the coordinate system of the optical effect layer. In case of orthonormal coordinate systems, three angle values (rotations about the particle axes z, y, and x) are generally required to define the orientation of a particle.

In the following, the term "elevation angle" of a particle shall refer, in a vertical cross-section through the effect layer along a direction x in the plane of the effect layer, to the easily observable angle between: (i) a straight line along an observed longest dimension within the corresponding cross-section shape of an intersected particle, and (ii) said direction x.

The binder material is, at least in its hardened state (see next paragraph), at least partially transparent to electromagnetic radiation of one or more wavelengths in the range of 200 nm to 2500 nm, i.e. within the wavelength range which is typically referred to as the "optical spectrum" and which comprises infrared, visible and UV portions of the electromagnetic spectrum. Particularly, the binder material may be at least partially transparent in the range of the visible spectrum between 400 nm and 700 nm. Thus, incident electromagnetic radiation, e.g. visible light, entering the OEL through its surface can reach the particles dispersed within the OEL and be reflected there, and the reflected light can leave the OEL again for producing the desired optical effect. If the wavelengths are selected outside the visible range, e.g., in the near UV-range, then the OEL may also serve as a covert security feature, as then typically technical tools will be necessary to detect the (complete) optical effect generated by the OEL under respective illuminating conditions comprising the selected non-visible wavelengths. The infrared, visible and UV portions of the electromagnetic spectrum approximately correspond to the wavelength ranges between 700-2500 nm, 400-700 nm, and 200-400 nm respectively.

Furthermore, the binder material has a first, fluid state, in which the particles dispersed therein are essentially freely rotatable, said first fluid state can be converted into a second, hardened state, in which the particles are fixed in their adopted positions and orientations and can no longer rotate. For example, the binder material may be a coating composition, more particularly an ink composition such as those which are used in security applications, e.g., for banknote printing. When the fluid binder material is hardened, for example by drying or curing by irradiation with suitable light (e.g. UV-VIS-light), said binder material converts into the second, hardened state where the particles are fixed in their current positions and orientations and can no longer move nor rotate within the binder material.

Figure 2:
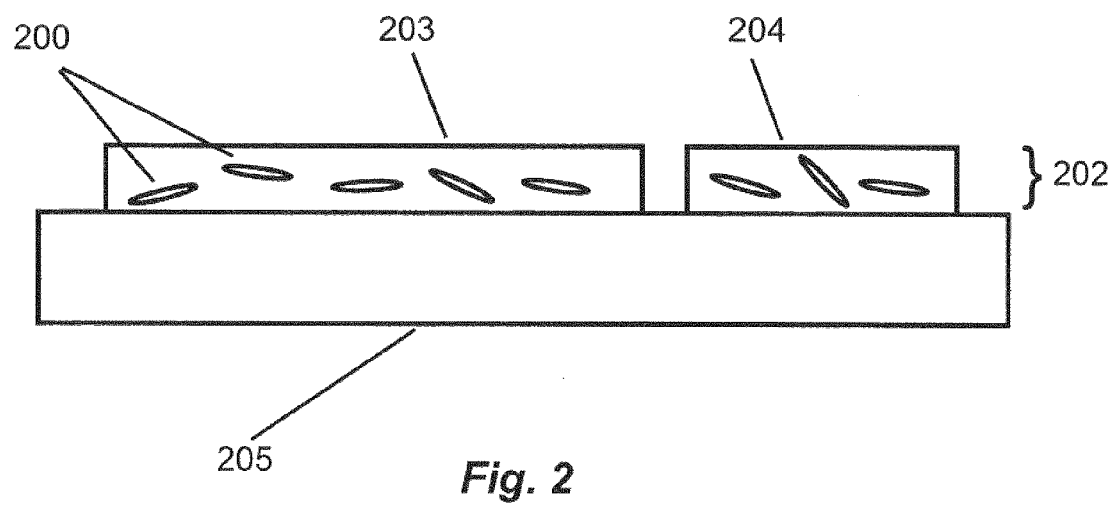
FIG. 2 schematically illustrates an optical effect coating (OEC) comprising two separate optical effect layer (OEL) components disposed on a substrate layer.

FIG. 2 schematically illustrates a cross-section of an exemplary OEL 202 having reflecting non-spherical particles 200 dispersed therein, according to some embodiments of the present disclosure. OEL 202 comprises two separate layer portions 203 and 204 disposed on a substrate layer 205. The portions 203 and 204 may or may not be connected to each other in the third dimension perpendicular to the cross-section, and form an optical effect coating ("OEC") comprising the substrate and the OEL itself. The OEL 202 may be disposed on the substrate 205, at least temporarily. This is particularly useful in applications where the OEL corresponds to an ink, e.g. a security ink, or some other coating material and is permanently disposed on a substrate like a banknote, passport or other value document, e.g. by way of printing. However, the substrate may also instead only be temporarily attached to the OEL, for example for facilitating the production of the OEL, particularly while the binder material is still in its fluid state. Thereafter the substrate may be removed from the OEL. Alternatively, the substrate may comprise an adhesive layer, and thus, the OEC comprising the OEL and the adhesive layer may be attached to all kinds of documents or other articles or items without printing or other processes involving machinery and rather high effort. Particularly, in some embodiments, the OEC is in the form of a transfer foil, which can be attached to a document or to an article in a separate transfer step. In such case, the substrate carries a release coating, on which an OEC as hereinbefore described is disposed. An adhesive layer may further be present on the optical effect coating.

The OEL described herein is preferably a radiation-cured coating and may be in particular a coating layer cured by radiation in the visible and/or UV ranges of the spectrum, more preferably in the 380 nm to 420 nm wavelength range, where LED based UV-curing equipment is or could be available.

The substrate 205 may be selected from the group consisting of non-woven materials, woven materials, metals and plastic polymer materials, and combinations thereof. Preferred non-woven materials are paper, cardboard, and spunbond olefin fiber such as Tyvek®. Preferred woven materials are the imprintable textiles. Preferred plastic polymer materials are polyethylene (PE), polypropylene (PP), in particular bi-axially oriented PP, and polyethylene-terephthalate (PET). Metals include without limitation those used for the preparation of metal coins and those used for the preparation of metalized plastic polymer materials such as metalized security threads. Particularly preferred substrates are banknote papers and polymer banknote substrates, as well as hybrid substrates including paper and polymer layers or parts or fibers. The substrate 205 may be further selected from transparent materials and opaque materials, and may furthermore carry printed, coated, or laser-marked or laser-perforated indicia. Additionally, the substrate 205 may further carry additional coatings or layers (not illustrated), on top or below the OEL or on its face opposite the OEL. In particular, the substrate may carry a primer layer under the OEL of the present disclosure, which serves, e.g. to enhance the quality of the magnetically transferred pigment orientation image, to promote adhesion, etc. The substrate may further carry a protective coating over the OEL, which serves, e.g. to increase its wear and soil resistance, to change its optical gloss, etc.

The substrate, the OEL and/or any further coating layers described hereinbefore may further additionally comprise one or more marker substances, preferably selected from the group consisting of UV/visible/IR luminescent substances, UV/visible/IR absorbing substances, and magnetic substances and combinations thereof. Said substances may also serve as further security features enabling an automatic authentication, e.g. of a security document, by an authentication apparatus such as a high-speed banknote processing machine.

Each of the plurality of non-spherical particles dispersed within the binder material has a non-isotropic reflectivity with respect to an incident electromagnetic radiation for which the binder material is at least partially transparent, at least in its hardened state. Here, the term "non-isotropic reflectivity" refers to the varying fraction of incident radiation reflected by a particle into a viewing direction as a function of the particle's orientation. Thus, if the binder material containing the oriented reflecting particles, i.e. the OEL, is tilted with respect to the viewing direction under given illumination conditions, the fraction of reflected radiation of each of the particles may change for each particle individually. Generally, the particles in the binder material may be pigment particles, e.g. pigment particles within a coating material such as an ink.

The particles have a non-spherical shape and may for example be prolate or oblate ellipsoid-shaped, platelet-shaped or needle-shaped particles or mixtures thereof. Thus, even if the intrinsic reflectivity per unit surface area (e.g., per $\mu m^2$) is uniform across the whole surface of such particle, due to its non-spherical shape, the reflectivity is non-isotropic as the visible area of the particle depends on the direction from which it is viewed.

In some embodiments, the particles may comprise a magnetic or magnetizable material, which allows to use an external magnetic field for orienting the particles within the binder material of the OEL according to a desired orientation pattern. Thereby, a permanent magnetic particle is oriented such that its magnetic axis is aligned with the direction of the external magnetic field line at the particle's location. A magnetizable particle without an intrinsic permanent magnetic field is oriented by the external magnetic field such that the direction of its longest dimension (hereinafter also referred to as the particle's length or size) is aligned with a magnetic field line at the particle's location.

To be oriented along the magnetic field lines, the magnetic or magnetizable particles must have a non-spherical shape, e.g., a prolate or an oblate shape. Suitable magnetic or magnetizable particles can be of any type of magnetic pigment, preferably platelets (flakes) or needles or mixtures thereof. Examples of useful magnetic particles include without limitation platelet- (e.g., flake-) or needle-shaped particles comprising a ferromagnetic or ferrimagnetic material, such as cobalt, iron, or nickel, or a magnetic alloy of manganese, cobalt, iron or nickel, or a magnetic pure or mixed oxide of chromium, manganese, cobalt, iron or nickel, or a mixture thereof. Examples of magnetic oxides include without limitation the pure and mixed iron oxides such as hematite ($Fe_2O_3$), acicular magnetite ($Fe_3O_4$), magnetic ferrites ($MFe_2O_4$), magnetic orthoferrites ($RFeO_3$), magnetic hexaferrites ($MFe_{12}O_{19}$), magnetic garnets ($R_3Fe_5O_{12}$) etc., M being a two-valent metal ion, and R being a three-valent ion of the group comprising Yttrium and the Rare-Earths; cobalt oxide ($Co_3O_4$) and chromium dioxide ($CrO_2$).

Most preferred suitable magnetic or magnetizable particles are optically variable magnetic particles. The particles may particularly be optically variable pigment flakes. In some preferred embodiments the particles may further comprise a color-generating thin-film Fabry-Perot interference stack comprising an absorber/dielectric/magnetic/dielectric/absorber five-layer sequence, or an absorber/dielectric/reflector/magnetic/reflector/dielectric/absorber seven-layer sequence, such as disclosed in U.S. Pat. No. 4,838,648, EP 686,675 B1, WO 02/73250 A2 or in WO 03/00801 A2. Corresponding inks and coating compositions have been disclosed in WO 2007/131833 A1. The color of optically variable magnetic particles noteworthy depends on the viewing angle with respect to the plane of the pigment flake, which results in a margin of different color appearing around the bright zones of the optical effect layer (OEL). For example, in the case of green-to-blue optically variable pigment flakes, which appear green under orthogonal and blue under grazing view, the bright zones of the OEL appear in green with a blue margin on a dark ground. The use of optically variable magnetic pigment in the OEL of the present disclosure enhances thus the contrast of the bright zones and improves the visual impact of the OEL in document security and decorative applications. Using optically variable magnetic particles also adds a further layer of security to the OEL, because such type of material is reserved to the security printing industry and not commercially available to the public. For visible radiation, the presence of both, the apparent motion of zones and the color-shift with changing viewing angle, is easily verified by the unaided eye.

The particles dispersed within the binder material are oriented according to a pattern extending over a length along a first direction (x) within an extended surface of the OEL, e.g. in the example of FIG. 2 this extended surface could be the top surface of OEL 202.

Figure 3:
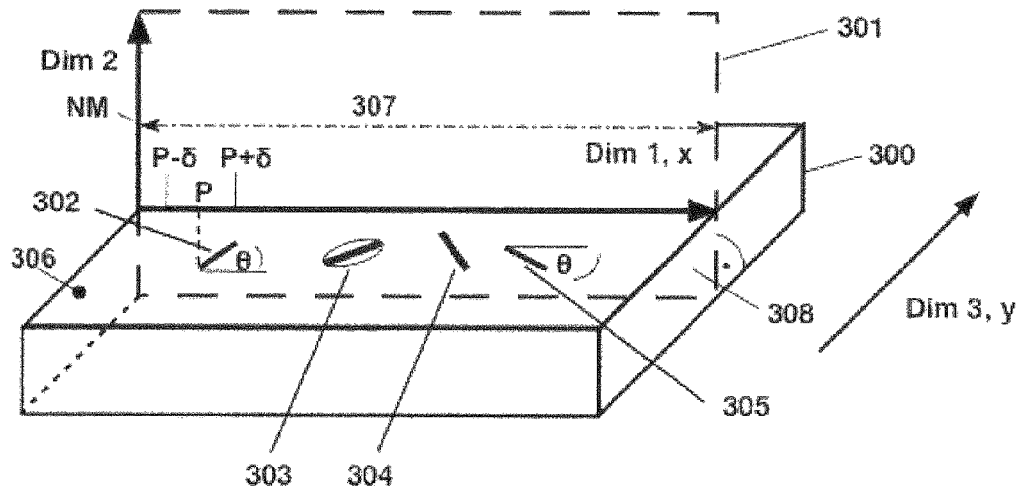
FIG. 3a schematically illustrates an OEL having a plane surface and a cross-section perpendicular thereto and along a first direction within an extended surface of the OEL.
FIG. 3b schematically illustrates an OEL having a curved surface and a cross-section perpendicular thereto and along a first direction within an extended surface of the OEL.
Figure 3:
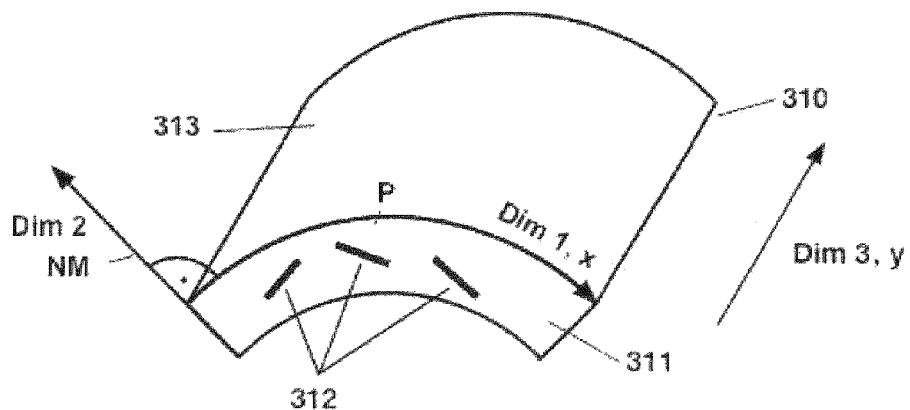

The orientation of the non-spherical particles within the OEL may be defined as illustrated in FIG. 3a and FIG. 3b.

FIG. 3a generally shows an OEL 300 with exemplary particles 302 to 305 representing a plurality of particles dispersed within OEL 300. Generally the non-spherical particles are dispersed throughout the whole volume of the OEL, while for the purpose of discussing their orientation within the OEL, the exemplary particles 302 to 305 are all located within a same planar (first) cross-section 308 of the OEL, defined by a virtual plane 301 as described in more detail below. Since exemplary particles 302 to 305 are located within the plane 301, they intersect with plane 301, respectively the (first) cross-section 308, which thus defines a cross-section shape for each of particles 302 to 305 which are graphically depicted, each by a short line representing its longest diameter appearing within its cross-section shape. Exemplarily, only for non-spherical particle 303 the cross-section shape of the particle is also depicted as an ellipse, whose longest diameter corresponds to the short line representing the particle 303. The total number of non-spherical reflecting particles in the OEL may be appropriately chosen in function of the desired application; however, to make up a surface-covering pattern generating a visible effect, several thousands of particles per square millimeter of OEL surface are generally required. The plurality of non-spherical particles, which together produce the optical effect, may correspond to all or only to a subset of the total number of particles dispersed within the binder material. For example, the particles producing the optical effect may be combined with other particles contained in the binder material, which may be conventional or special color pigment particles.

The OEL as a physical object has generally three dimensions Dim1, Dim2 and Dim3, and its extension along at least one dimension, e.g. as illustrated in FIG. 3a its thickness along Dim2, is typically much smaller than its extension along the other dimension(s), e.g. the dimensions Dim1 and Dim3 in FIG. 3a. Accordingly, the OEL's extension along at least one of the dimensions, e.g. along Dim1, may be dominant. For practical purposes, i.e., for creating an optical effect extending over a significant length, one will usually select one of the larger surface portions, e.g. faces, of the OEL to show the desired optical effect. Preferably a surface portion or face of the OEL is selected, which is spanned up in the two of the dimensions of the OEL along which it shows its greatest extension. Thus, in the example of FIG. 3a, the dimensions Dim1 and Dim3 span up such a surface 306 of the OEL 300. This selected surface portion or face can be designated as an extended surface 306 of the OEL 300, or equivalently of the binder material, and a first direction x within this extended surface 306 can be selected, along which a viewing-angle dependent image appearing to move at least along this first direction x and over a length 307 is produced, when the viewing angle relative to the first direction x changes. The length may be the same or less than the extension of the OEL along the first direction. The viewing angle changes for example when the extended surface 306 of the OEL 300 is tilted with respect to the line of sight between the viewer's eyes and the OEL 300 such that the (viewing) angle between the first direction 306 and the line of sight varies. This effect is produced by the plurality of particles dispersed within the OEL, as will be explained in detail below. Preferably, the length 307 along the first direction x is at least 20 mm in order to provide an enhanced eye-catching apparent motion of an image when the viewing angle is changed.

The particles have a non-random orientation within the OEL 300 which forms an orientation pattern extending over the length 307 along at least the first direction x within the extended surface 306 of the OEL 300. For expressing the orientation of a particle a cross-section plane 301 is defined, which plane is spanned up by the first direction x within the extended surface and a normal NM to the extended surface of the layer. In the example of FIG. 3a this normal NM is along the dimension Dim2 of the OEL. The plane 301 thus defines a perpendicular cross-section 308 through the OEL. In FIG. 3a the exemplary particles 302 to 205 are each located within this cross-section 308 and the short lines representing the particles depict their respective longest dimension within their cross-section shape within plane 301 defining the cross-section 308.

FIG. 3b illustrates another example OEL 310 with particles 312 dispersed therein, which has a curved, particularly a cylindrical, extended surface 313 extending along a first dimension Dim1 and a third dimension Dim3. Also in this example, a plane is defined and spanned up by a first direction x within the extended surface 313 and a normal NM to the extended surface, e.g. parallel to the second dimension Dim2 In the examples of FIGS. 3a and 3b the first direction is along the first dimension Dim1, and the respective normal NM is along the second dimension Dim2. The plane thus defines a cross-section 311 through the curved OEL in which exemplary particles 312 are located.

The orientation of a particle can then be described by the easily measurable elevation angle $\theta$ between the first direction x and a line along the longest dimension of the cross-section shape of the particle within plane 301. For each particle a position P can be defined as a coordinate along the first direction of a point on the particle's cross-section shape. Particularly, the coordinate may correspond to a perpendicular projection of the point on the particle onto said first direction. For example, the point on particle's cross-section shape may be taken as the center of gravity of the particle's cross-section shape or as the center point of its longest dimension within the cross-section shape or as the point within the cross-section shape having the smallest (or largest) coordinate value along said first direction of any point of the particle on the cross-section shape. The latter case is illustrated in FIG. 3a, where the respective leftmost point of the cross-section shapes of particles 302 and 305 is selected for defining the position P as a corresponding coordinate along the first direction.

The average value of the elevation angle $\theta$ (defined as described above) of the particles within the plurality of particles, whose position P (as defined above) falls within an interval centered at a position P along the first direction, defines a function $\theta(P)$ of the position P at least over a length along the first direction, e.g. in FIG. 3a over length 407. This average angle is also referred to as "local average of the elevation angle $\theta$" or "local average of the angle" and is thus taken as an average of the respective elevation angles over a local population of particles located in the perpendicular (first) cross-section through the OEL. Thereby said local averaging of the angles is performed only over those particles, which intersect the cross-section (e.g., cross-section 308 or 311 in FIG. 2) within a delimited interval [P−δ; P+δ] of length 2δ and attributed as the local average angle to the position P along the cross-section. Said length 2δ is typically in the range of 50 to 1000 micrometers. The angle to be averaged is the angle between a straight line along an observed longest dimension within the corresponding cross-section of an intersected non-spherical particle and the first direction x at the position P.

According to the present disclosure the local average elevation angle of the particles within the plurality of non-spherical particles dispersed within the binder material satisfies a corresponding function $\theta(P)$, which is a function equal to the sum of a first function $\theta_1(P)$ and a second function $\theta_2(P)$. The first function $\theta_1(P)$ is a monotonically increasing or decreasing first function of said position P and the second function $\theta_2(P)$ is an alternating second function of said position P. Herein, an alternating function shall mean any function which oscillates between positive and negative values about a mean value of zero.

Figure 4:
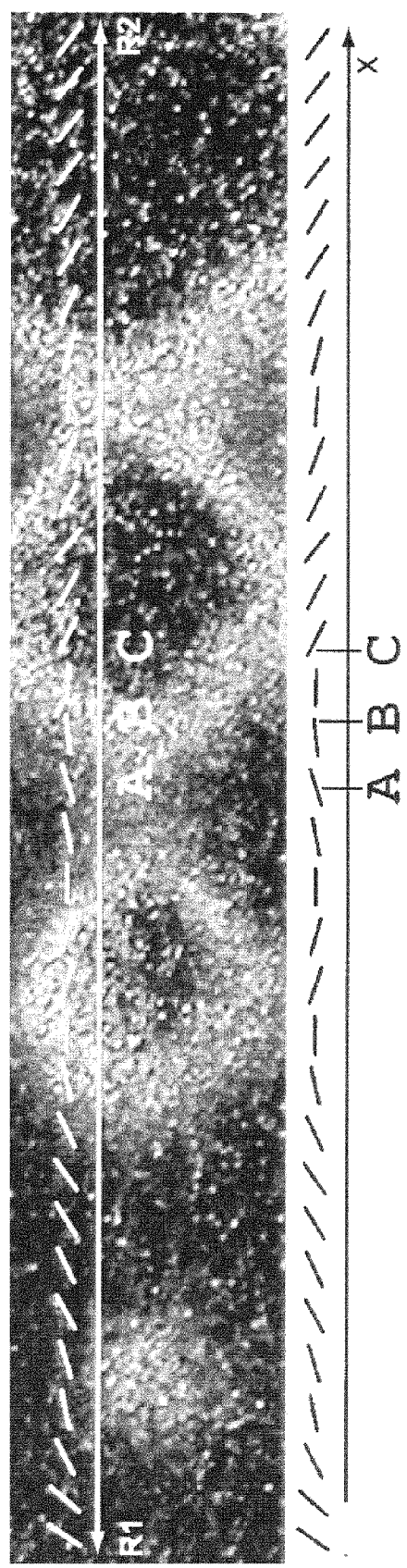
FIG. 4 illustrates the variation of the elevation angle of platelet-shaped pigment particles with respect to the substrate plane in a cross-section along the indicated line (R1-R2) of an exemplary OEL comprising said particles, on a substrate, according to an embodiment of the present disclosure.

FIG. 4 illustrates a top view on an example OEL and the corresponding orientation pattern of the particles therein, according to an embodiment of the disclosure. The image of the OEL is produced through reflection of orthogonally incident light by the non-spherical particles. In this example, the particles are in the form of planar platelet-shaped particles having a thickness much smaller than their extension in the other two dimensions. The first direction within the visible extended surface of the OEL is indicated as the line between points R1 and R2 and the variation of the average orientation of the particles with respect to the first direction is shown above the line (for illustration purposes the schematically illustrated particles are shown turned by 90 degrees around the axis defined by the line between R1 and R2) and copied again (for the sake of a better visibility) below the image. The particles orientation is thus shown in the form of a perpendicular cross-section of the flakes along the line R1-R2, such as obtained from electron micrographs of the polished trench of vertical cuts along said line, similar to the micrographs in FIG. 6. As the particles are platelet-shaped particles their cross-section shape corresponds approximately to a thin line. Based on their shape, the particles have their maximum reflectivity (maximum projection area) in a direction perpendicular to their extended surface, and accordingly, at orthogonal view, in the image of the OEL, the bright areas correspond to particles whose orientation approximately matches that of the surface, i.e. which have a low angle $\theta$ with respect to the surface of the OEL such that the incident light is substantially reflected back in the same (orthogonal) direction. The dark areas of the OEL-image on the other hand correspond to particles whose orientation is significantly tilted with respect to the extended surface of the OEL, such that they reflect the light falling on them away from the orthogonal direction. It has to be noted though that the image of FIG. 4 solely shows the reflection image for orthogonally incident light and a viewing angle of 90 degrees relative to the image. FIG. 4 does not and cannot show the viewing-angle dependency of the image of an OEL and thus the desired effect of a moving image, which can only be achieved by a real OEL according to the present disclosure and not by a mere photo of it taken from a single viewing angle.

Figure 5:
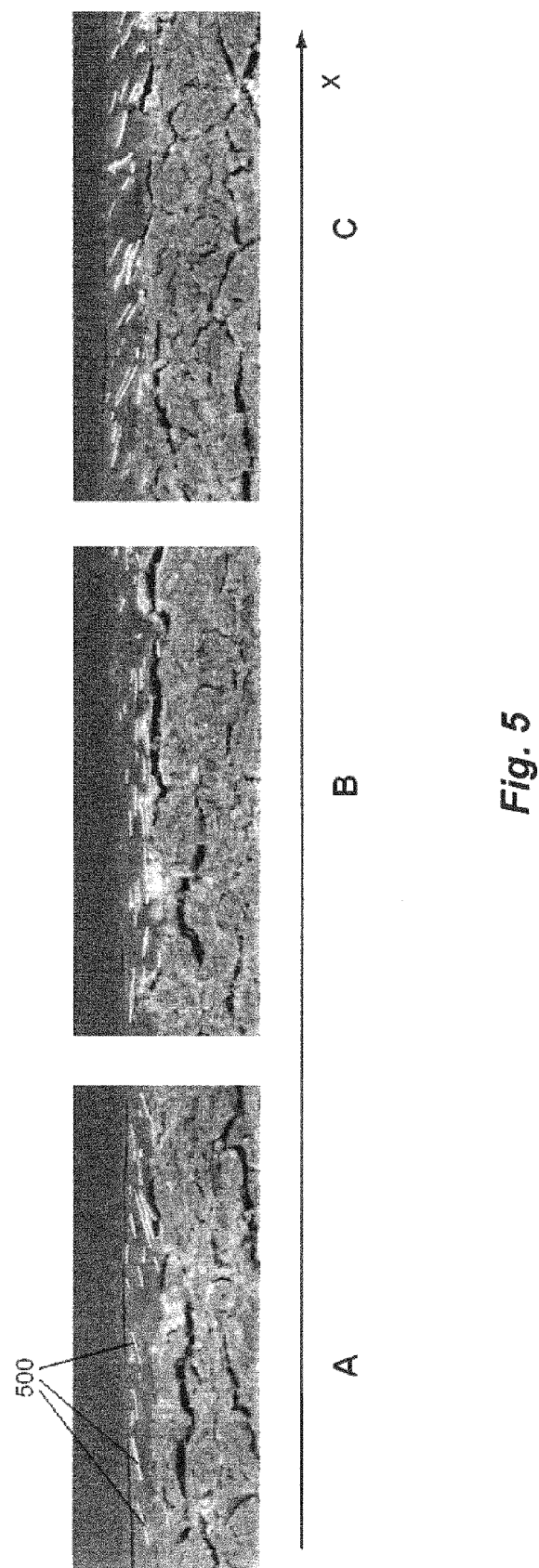
FIG. 5 illustrates the elevation angle of the platelet-shaped pigment particles with respect to the substrate plane, as seen in three co-planar SEM cross-sections taken at three indicated points A, B, and C along the indicated line (R1-R2) of FIG. 4.

FIG. 5 shows three electron micrographs of cross-sections of the OEL of FIG. 4 cut perpendicular to its extended (top) surface. In this example, the OEL is disposed on a substrate and thus forms an OEC. The micrographs were taken at the locations A, B, and C, respectively, which are identified in FIG. 4 along the first direction, i.e. along the indicated line (R1-R2), and each show the substrate (at the bottom) covered by the OEL comprising oriented platelet-shaped particles 500. The average orientation of the particles located along the first direction x within respective intervals [P−δ; P+δ] at positions P are shown reported for said locations A, B, and C in FIG. 4, as can be verified by comparison with the corresponding micro graphs A, B, and C of FIG. 5.

Figure 6:
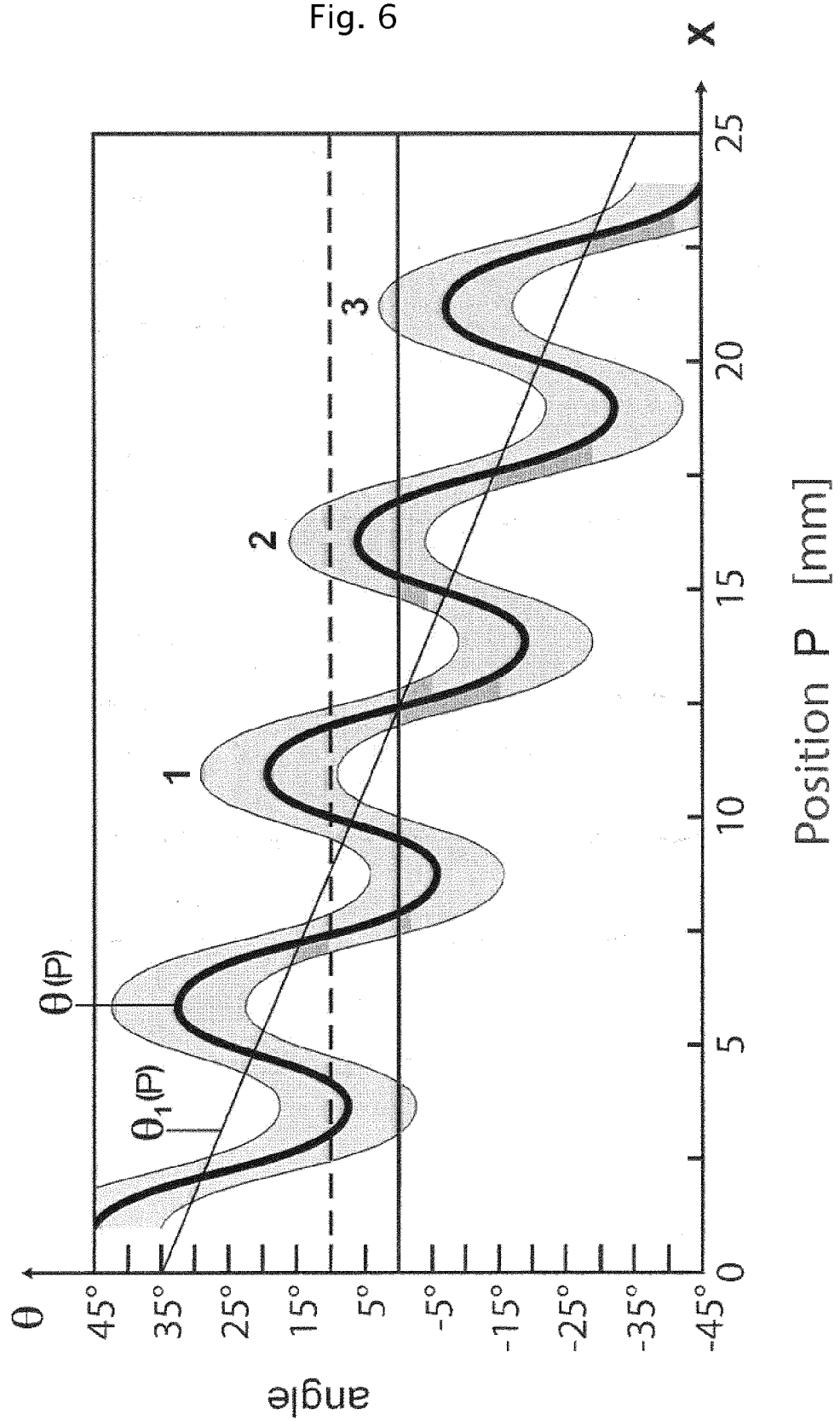
FIG. 6 schematically illustrates the variation of the particle angle θ (herein also referred to as "elevation angle") with respect to a first direction x within the surface of an OEL, along which the image appears to move, as a function θ of a position over a length along the direction x, for example the indicated line (R1-R2) of FIG. 5, as well as a corresponding exemplary first function $\theta_1$, according to an embodiment of the present disclosure.

FIG. 6 graphically depicts the local average elevation angle $\theta(P)$ of the pigment particles ("Flake orientation") distributed within respective intervals $[P-\delta; P+\delta]$ along the first direction x, i.e. the orientation of the pigment flakes with respect to the surface plane of the OEL along the first direction x, i.e. along line (R1-R2) of FIG. 4 and FIG. 5 as a function of their respective positions P on said line (see bold wavelike curve). The grey area around the curve of $\theta(P)$ schematically illustrates (not to scale) a standard deviation $\sigma$ of the distribution of the flake elevation angle $\theta(P)$ of the particle (flakes) within the interval $[P-\delta; P+\delta]$. The flakes or particles are noteworthy never perfectly aligned, and their orientation, thus also their elevation angle, fluctuates around a mean value according to a standard deviation.

The exemplary dashed line in FIG. 6 corresponds to an average elevation angle of 10°. All the particles at those positions P, where the dashed line crosses the wavelike function $\theta(P)$, reflect incident electromagnetic radiation into the same direction, i.e. along the same line of sight on the OEL at a corresponding viewing angle. Accordingly, if the OEL is viewed at a viewing angle relative to its surface (in FIG. 4 both the direction of incident light and the line of sight are substantially vertical to the depicted extended surface of the OEL), where those flakes having an elevation angle of around 10° within the OEL are oriented such that incident electromagnetic radiation falling on their surface is reflected along a line of sight in the direction of the viewer, the OEL at the positions P of these particles appears bright (e.g., at location B in FIG. 4). On the other hand, those areas of the OEL, whose average particle orientations differ substantially from 10°, such that the particles will show a much smaller reflectivity with respect to the direction of the incident radiation and the line of sight, will appear darker (e.g., at locations A and C in FIG. 4). If the viewing angle changes, e.g. when the OEL and its first direction are tilted relative to the line of sight, then in FIG. 6 this is equivalent to moving the dashed line up respectively down towards a higher respectively a lower local average elevation angle $\theta$. Accordingly, the intersections between the dashed line and the curve of $\theta(P)$ will also move to a different location P along the first direction and as a consequence the pattern of bright and dark areas on the extended surface of the OEL will also appear to move along the first direction x. Particularly, when the dashed line reaches a point where it intersects with a local maximum or a local minimum of $\theta(P)$ and the OEL is further tilted, then the bright area corresponding to the local maximum or minimum disappears. Similarly, a new bright area is produced, when by tilting the OEL the moving dashed line approaches a local maximum from the top, respectively a local minimum from the bottom and thus establishes a new intersection at a Position P where there was no intersection before.

A further (straight) curve shown in FIG. 6 represents an exemplary embodiment of a first function $\theta_1(P)$ which decreases monotonously along the length (i.e. the range of positions from 0 to 25 mm in this example) from a maximum value $\theta_{1,max}$ of around 35° to a minimum value $\theta_{1,min}$ of around −35° and thus spans up a non-zero range of values, in this example of 70°. Preferably, the difference between the maximum value $\theta_{1,max}$ and the minimum value $\theta_{1,min}$ is at least 30°, i.e., the values of said monotonically increasing or decreasing first function $\theta_1(P)$ span a difference of at least 30 degrees over said length. Other selections of the first function, which may or may not be linear over a length along the first direction, are also possible.

The second function $\theta_2(P)$ (not depicted in FIG. 6) is then equal to the difference of the functions $\theta_2(P)=\theta(P)-\theta_1(P)$. It is an alternating function, i.e. it oscillates between positive and negative values about a mean value of zero. Preferably, its amplitude is half or less than the range spanned up by the values of the first function $\theta_1(P)$. Thus the second function $\theta_2(P)$ can be interpreted as a modulation of the first function $\theta_1(P)$. Accordingly, the first function can be considered a principal component and the second function an auxiliary component of the function $\theta(P)=\theta_1(P)+\theta_2(P)$.

The principal component $\theta_1(P)$, substantially determines the local average elevation angle of the particles over the length along the first direction, while the alternating auxiliary component causes a modulation of the local average particle elevation angle determined by the principal component. Again with reference to FIGS. 4 and 5, the particles in region A point their face up-left, particles in region B point their face up, and particles in region C point their face up-right. The principal component may be monotonously increasing or decreasing over the length along the first direction. In particular, the principal component may be a linear function $\theta_1(P)=aP+b$, corresponding to the linear gradient of a parabolically shaped magnetic field line of a dipole magnet (DM) as in FIG. 1. The principal component may also follow a more sophisticated function of the position P over the length along the first direction x, e.g. on line (R1-R2) in the above examples.

The alternating function serving as the auxiliary component may either be a periodic function $\theta_2(P+K)=\theta_2(P)$ of period K, such as a sine function, or else a more general, non-periodic function. Particularly, in some embodiments the second function has an amplitude large enough to cause the sum $\theta(P)$ of the first function $\theta_1(P)$ and the second function $\theta_2(p)$ to be a non-monotonous function, whose first derivative changes sign at least twice over the length along the first direction. Preferably, the amplitude of the auxiliary component, i.e. the modulation of the local average particle elevation angle, causing the positive or negative excursion of said angle from the average particle elevation angle, is in the range of 5° to 30°, more preferably in the range of 10° to 20° corresponding to a range of values for the first component at least twice as high. Thus, the height of a "bump" in FIG. 6 between a minimum and a subsequent maximum of $\theta$ (or vice versa) then approximately corresponds to twice the modulation, i.e. preferably 10° to 60°, more preferably 20° to 40° which is less than the range of values −35° to +35°, i.e. a total of 70°, spanned by the principal component. Thus the principal component may dominate in spite of the variation of the auxiliary component. Generally, dominance (in terms of amplitude) of the principal component over the auxiliary component is desirable for achieving that the desired optical effect provides an image which appears to move in an eye-catching manner along the length as the viewing angle varies.

In some embodiments, the orientation pattern also extends along a second direction y within the extended surface of the OEL respectively the binder material, the second direction y being different from the first direction x. Then, in a second cross-section of said OEL substantially perpendicular to said extended surface and along the second direction y, the local average angle between (i) a straight line along an observed longest dimension within the corresponding cross-section shape of those non-spherical particles which intersect with said second cross-section, and (ii) said second direction y varies according to a third function $(\theta_3)$ of a position along said second direction y. Thus the third function is defined in a similar manner as the first and second functions $\theta_1$ and $\theta_2$, however along the different direction y. Particularly, in some embodiments this third function $\theta_3$ may be an alternating function of said position along said second direction y.

In further embodiments, said local average angle along the second direction y may vary according to a fourth function $\theta_4$ of a position along said second direction y. This fourth function $\theta_4$ is the sum of a function being equal to said first function $\theta_1$ of said position but along said second direction y (and not like the first function itself along the first direction x) and an alternating fifth function $\theta_5$ of said position along said second direction y. Thus, the image produced by the oriented non-spherical particles in the extended surface of the OEL optical effect shows a structure not only along the first direction but at least also along the second direction y.

In a particular embodiment, the function $\theta(P)$ substantially shows a rotational symmetry with respect to rotations of the first direction within said extended surface of the binder material and around a particular point on the extended surface by a rotation angle, at least for selected rotation angles. In other words, if the first direction is rotated within the extended surface of the OEL by a rotation angle for which such rotational symmetry occurs, then the function $\theta(P)$ is unchanged by this rotation. Accordingly, the optical effect defined via the function $\theta(P)$ also remains unchanged under such rotation.

For example, in some embodiments both the first function $\theta_1(P)$ and the second function $\theta_2(x)$ are invariant with respect to rotations of the first direction within the extended surface of the OEL, then also the sum function $\theta(P)$ shows this invariance. Accordingly, the so obtained OEL has no preferred direction, but instead shows the same optical effect along any direction for a given viewing angle and direction of incident radiation relative to the extended surface of the OEL.

In yet other particularly preferred embodiments, only one of the principal and the auxiliary component show such rotational symmetry with respect to rotations of the first direction, at least for selected rotation angles.

In a particular embodiment of the OEL, a small slice of image elements, orthogonal to said first direction, is used to embody a security element. Said image elements have the property to "appear" and "disappear" depending on the viewing angle as described above, and can be used to embody a "latent image" on a document, i.e. an image which is only visible under determined viewing angles, and which is therefore difficult to copy.

In a further particular embodiment of the OEL, a slice or slices of image elements orthogonal to said first direction is or are absent or hidden, resulting in a "switching on-off" appearance of those image elements which are present, rather than in a dynamic motion appearance, of image elements of the optical effect coating OEC with changing viewing angle. This can typically be achieved with a discontinuous OEC made up of several OEL elements.

Figure 7:
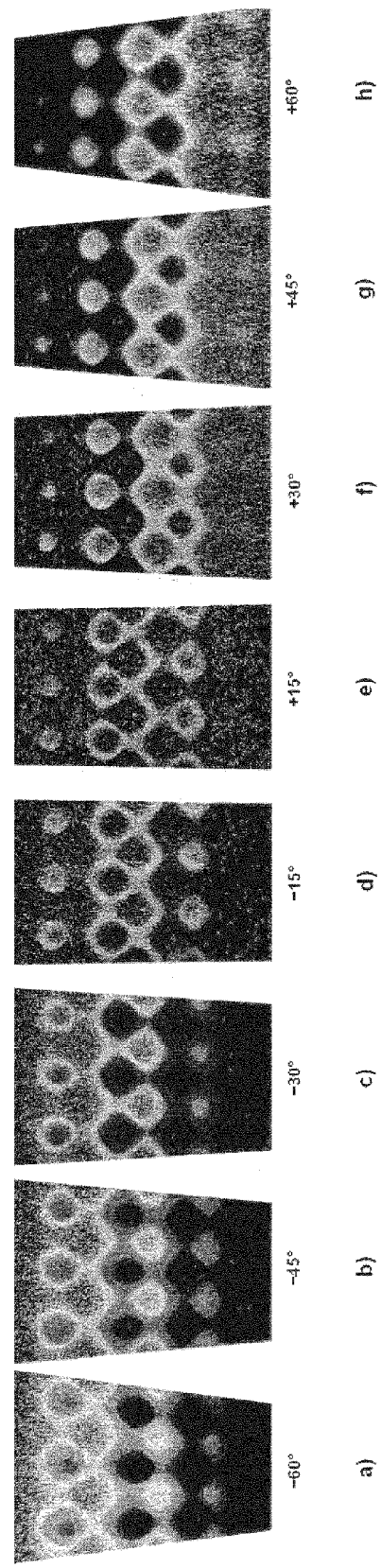
FIG. 7 shows an OEL according to an example of the present disclosure, as seen under tilted viewing angles (a-c, f-h) and under nearly orthogonal viewing angles (d-e)

FIG. 7 illustrates an exemplary image of an OEL according to the present disclosure at eight different tilt angles along said first direction. A large edge denotes the side of the image, which is close to the observer; a small edge denotes the side of the image which is away from the observer. In other words, the position of the observer for FIG. 7a is on the top side of the OEL, while it is on the bottom side for FIG. 7h. The corresponding tilt angles, i.e. viewing angles relative to the surface of the OEL, are as follows: FIG. 7a: $-60°$; FIG. 7b: $-45°$; FIG. 7c: $-30°$; FIG. 7d: $-15°$; FIG. 7e: $+15°$; FIG. 7f: $+30°$; FIG. 7g: $+45°$; FIG. 7h: $+60°$. The striking, non-photocopy-able apparent progression or regression of clear and dark perceived image elements is immediately apparent to the unaided eye upon tilting the OEL.

Finally, in some embodiments the OEL may comprise in addition to said plurality of non-spherical particles at least one of: non-color-shifting magnetic particles, colorless magnetic particles, color-shifting non-magnetic particles, non-color-shifting non-magnetic particles and colorless non-magnetic particles. Thus further properties of the OEL, e.g. its color and/or color-shift with viewing angle can be conferred or altered in addition to the above-described dynamic optical effect. Particularly, such additional particles may be pigment particles.

II. Orienting Device

The present disclosure also discloses a device for orienting magnetic or magnetizable particles dispersed within a binder material. Thus, the device can be used for producing an OEL as described above in cases where the particles are magnetic or magnetizable particles.

The device comprises an arrangement of one or more magnets comprising a magnetized magnetic plate and being so configured as to produce a combined magnetic field. The combined magnetic field comprises a first magnetic field component and a second magnetic field component. The first magnetic field component is substantially similar to a magnetic dipole field and has its North-South direction aligned substantially parallel to said magnetized magnetic plate. The second magnetic field component comprises a superposition of individual local dipole-like magnetic fields and thus corresponds to an alternation of magnetic North and South poles along a first direction substantially parallel to said North-South direction. The first magnetic field component and the second magnetic field component overlap at least in a region adjacent to an extended surface of said magnetized magnetic plate, i.e. in a region in the vicinity of the surface of the magnetized magnetic plate to which the plate forms a boundary. This region defines an orientation region in which the OEL is to be placed for orienting magnetic or magnetizable non-spherical particles having a non-isotropic reflectivity dispersed therein. In this orientation region the field lines of the magnetic field of the magnet arrangement have a desired form according to the desired particle orientation specified herein above.

Because the magnetic or magnetizable particles within the binder material, when it is in a fluid state and the particles are rotatable therein, align themselves along the field lines as described herein above, the achieved respective orientation of the particles (i.e., their magnetic axis in the case of magnetic particles or their greatest dimension in the case of magnetizable particles) coincides, at least on average, with the local direction of the magnetic field lines at the positions of the particles. Thus the device is suitable for producing an OEL according to the first aspect of the present disclosure.

In a first set of principal embodiments described herein below the magnet arrangement of one or more magnets comprises one or more magnets (hereinafter "first magnet/magnets) configured to produce the first magnetic field component, and a magnetized magnetic plate MP configured to produce the second magnetic field component. Thus, in the first set of principal embodiments, the two magnetic field components are generated separately, i.e. by separate magnets.

Figure 1A:
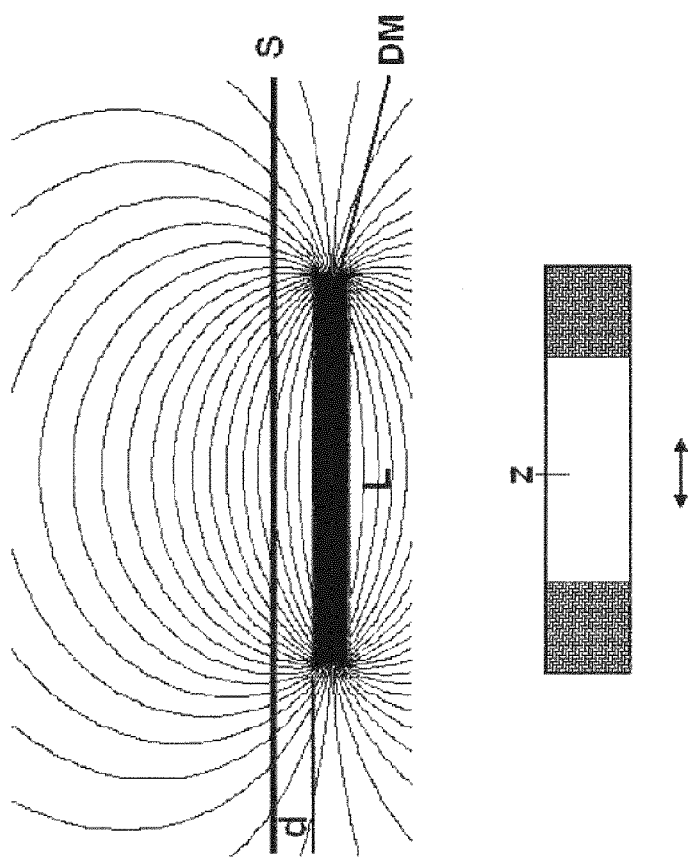

In some of the embodiments the first magnets comprise a dipole magnet DM which is configured such that its magnetic axis, defined by the line connecting its magnetic north and south poles, is aligned substantially parallel to the first direction or to a tangent thereof. FIGS. 1a and 1b show examples of such a configuration, where the shown dipole magnet DM represents the first magnet. It is noted that in FIGS. 1a and 1b, which relate to the prior art, the magnetic plate generating the second magnetic field component is missing.

Further, at least one of the first magnets may be mounted so as to be rotatable in a plane substantially parallel to the plane of said magnetized magnetic plane MP. Thus, an effective magnetic field component corresponding to the first function can be generated to show, at least to some approximate degree, a rotational symmetry. In addition the magnetic plate may be rotatable, e.g. in combination with the first magnets around the same axis, such that an effective magnetic field can be generated by rotating the magnet arrangement, which is rotationally symmetric, at least over a range of rotation angles, thus causing a corresponding rotational symmetry within the OEL whose non-spherical magnetic or magnetizable particles are oriented thereby during the rotation of the magnet arrangement.

Particularly, if the rotation is around a full turn of 360 degrees or more, a circularly averaged magnetic field is produced for the production of an OEL which has no preferred direction, but shows the optical effect of the disclosure along any direction, under an arbitrary axis of tilt in the plane of the OEL.

The magnetized magnetic plate MP may have a first and an opposite second extended surface, wherein the first surface is located closer to the orientation region than the second extended surface, and a multi-pole magnetization at least across its first surface. Particularly, this multi-pole magnetization of the magnetic plate MP may be a two-dimensional alternating multi-pole magnetization.

By comparison with the above description of the OEL one recognizes that the one or more first magnets are responsible for orienting the magnetic or magnetizable particles within the OEL according to the principal component $\theta_1$ of the orientation function $\theta$. The magnetized magnetic plate MP is responsible for orienting the magnetic or magnetizable particles within the OEL according to the auxiliary component $\theta_2$ of the orientation function. Accordingly, the first magnets are responsible for generating the basic effect of a viewing angle dependent moving image, while magnetized magnetic plate MP is responsible for generating modulations of the principal component, which are in addition necessary to achieve the improved optical effect provided by the present disclosure.

Figure 8:
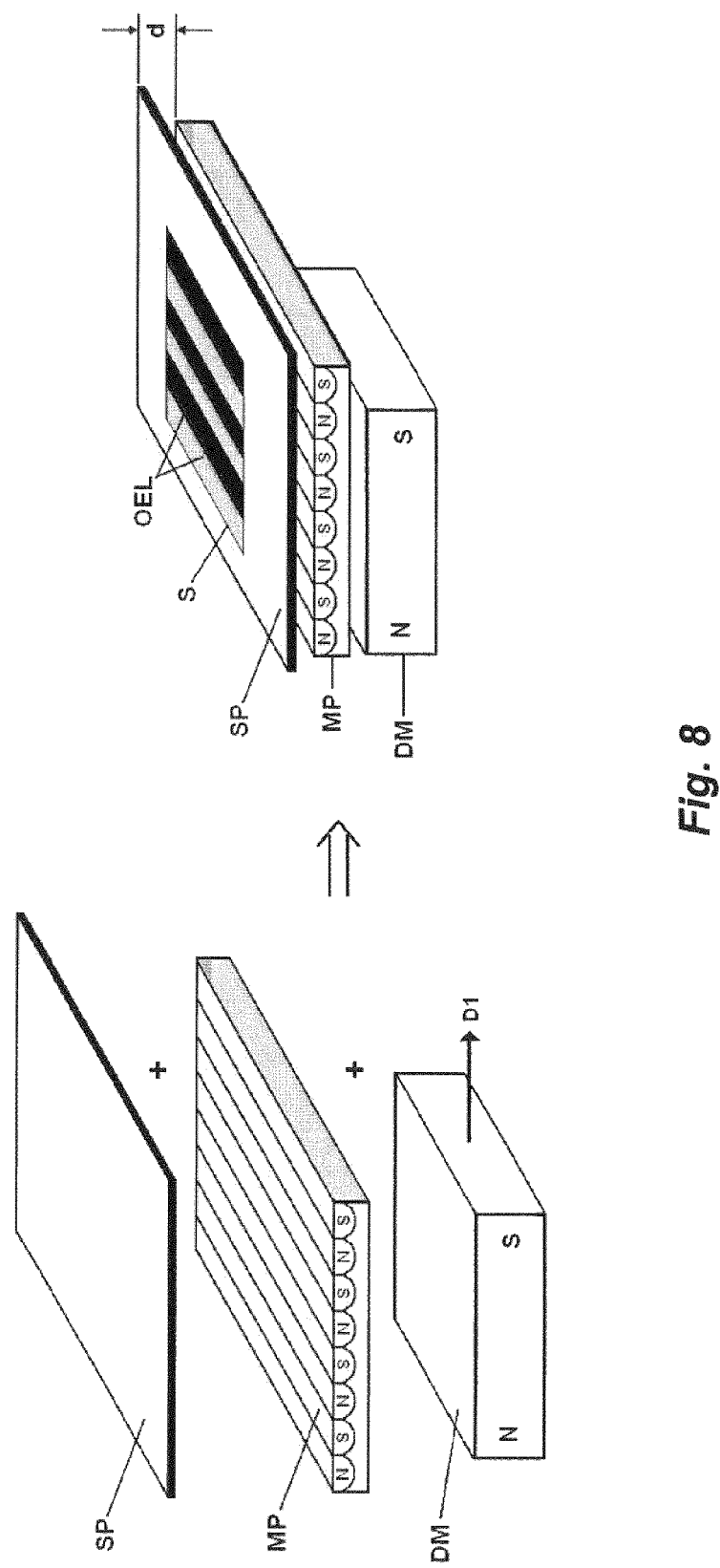
FIG. 8 schematically illustrates the structure of a device for producing an OEL, according to one exemplary embodiment of a first principal set of embodiments the present disclosure.

An exemplary embodiment of a device according to the first set of principal embodiments is now explained with reference to FIG. 8. In this example a magnetic plate MP has a multi-pole magnetization of alternating north- and south-poles at least across its upper surface. A dipole magnet DM is disposed below the lower surface of said magnetic plate MP, having its north-south direction D1 substantially parallel to the plane of said magnetic plate MP. A support in the form of a supporting plate SP may be provided on top of the magnetic plate, preferably substantially parallel thereto. Furthermore, the top surface of the support plate may be located at a distance d from the magnetic plate MP, depending on the form of the magnetic field lines, such that the desired form of the field lines occurs in the orientation region above the top surface of the support. This distance d is typically in the range between 0.1 to 5 millimeters. In a preferred embodiment, the thickness of the supporting plate SP equals said distance d, which allows for a mechanically solid assembly of the device, without intermediate voids. The supporting plate SP may be of a non-magnetic or of a magnetic material.

When a layer of the unhardened binder material and containing the magnetic or magnetizable non-spherical particles dispersed therein is placed on the supporting plate above the magnet arrangement, the magnetic or magnetizable particles within the (fluid) layer are oriented to align with the field lines of the combined magnetic field of the dipole magnet DM and the magnetic plate MP at the locations of the particles.

Figure 9:
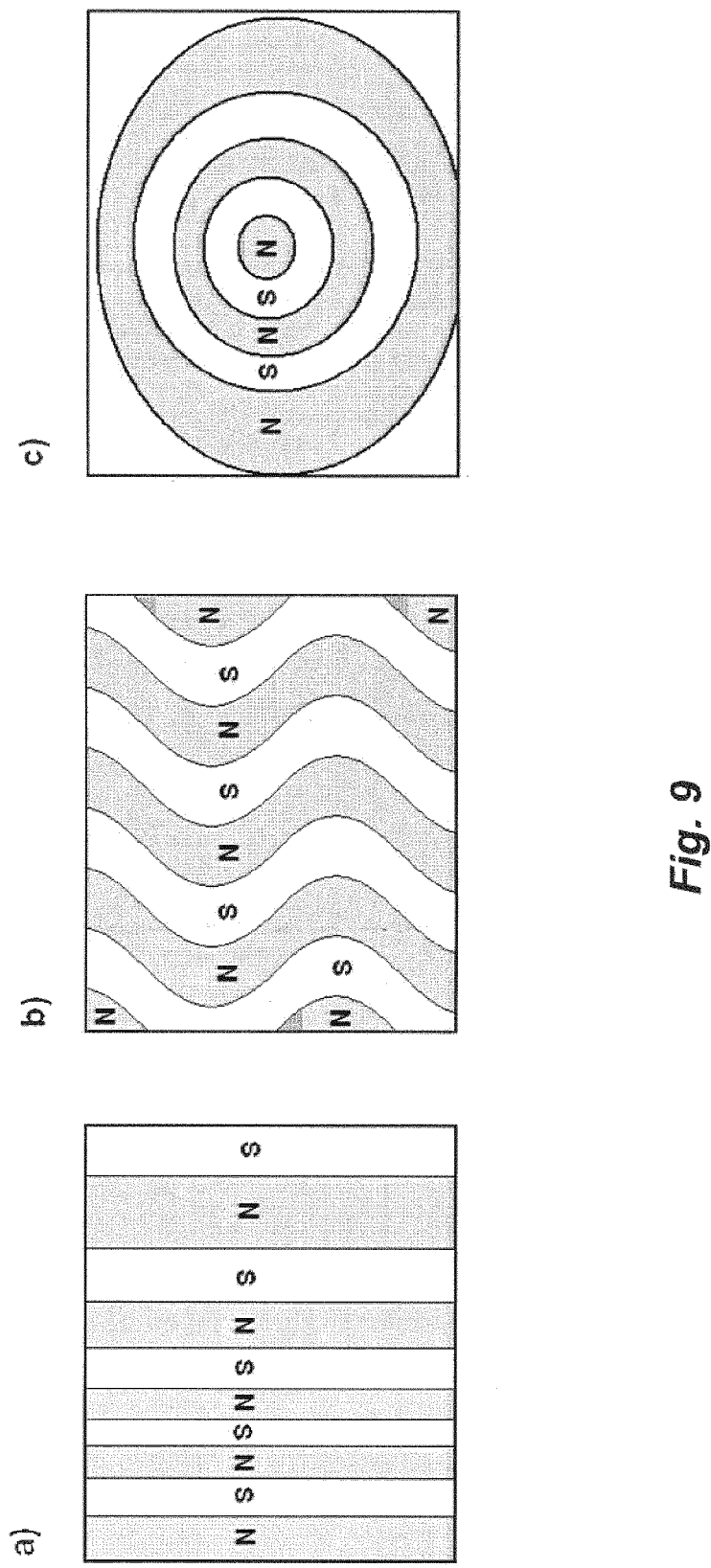
FIG. 9 schematically illustrates various exemplary magnetization patterns of a 2-dimensional multi-pole magnetization of a magnetic plate of the device of the present disclosure.

Said multi-pole magnetization of said magnetic plate MP may be any stripe-wise alternation of magnetic north- and south-poles, such as a regular linear stripe pattern in a determined direction D1, a pattern of irregular linear stripes (FIG. 9a) or a pattern of curved stripes (FIG. 9b) or a pattern of arbitrarily-shaped stripes. The alternating multi-pole magnetization of the magnetic plate MP may furthermore be a circular pattern (FIG. 9c), an elliptic pattern, or more generally any closed-loop pattern.

The multi-pole magnetization may further be present only at a single (e.g., the upper) surface of the magnetic plate MP, or it may run across the entire thickness of the plate, appearing with equal strength on both opposite extended (e.g., top and bottom) surfaces of the plate.

The north-south direction D1 of the dipole magnet DM may be chosen according to the design requirements and it defines the first direction x, along which the produced OEL exhibits the apparent motion of perceived image elements with changing viewing angle, e.g. when tilting it around an axis orthogonal to said first direction x.

Figure 10:
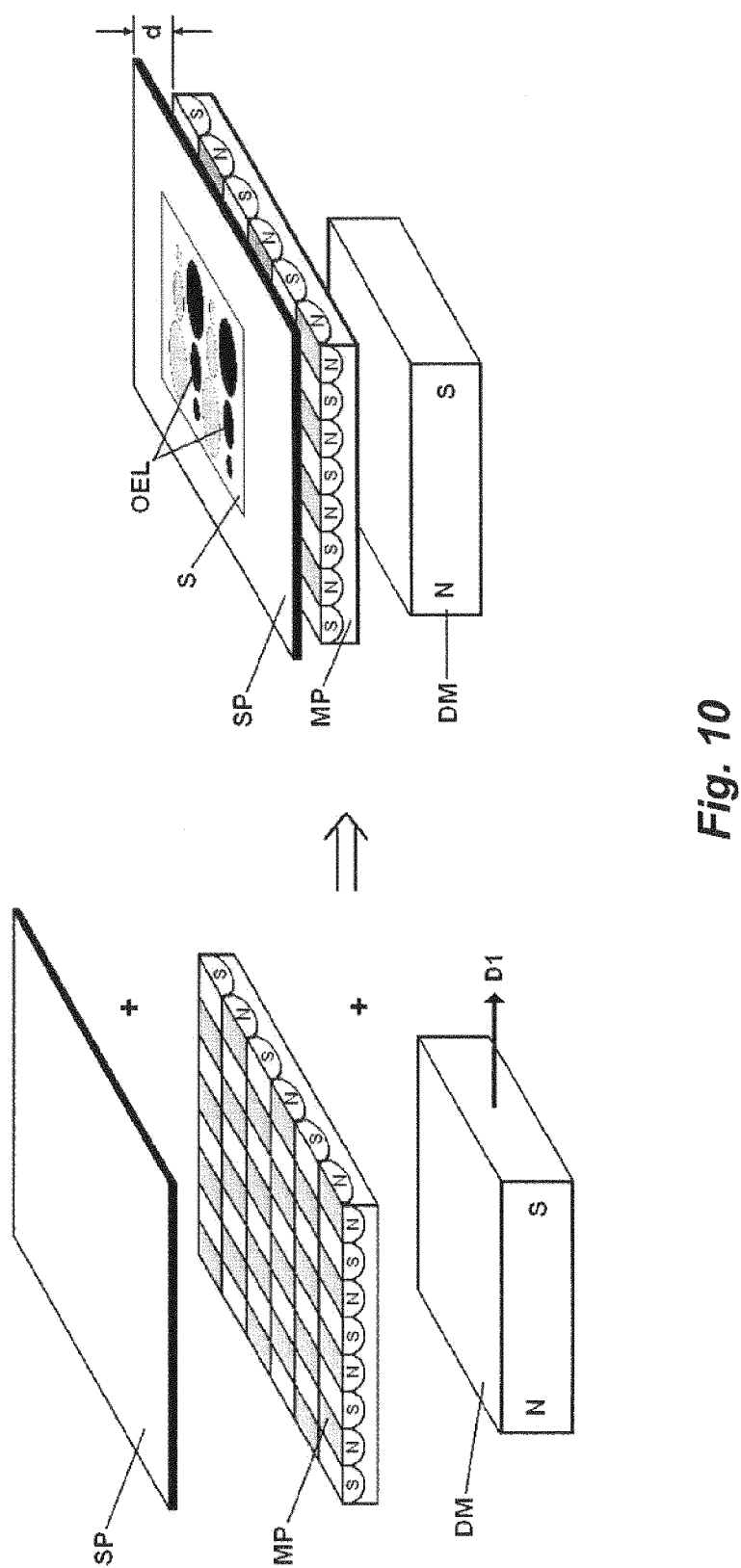
FIG. 10 schematically illustrates the structure of a device for producing an OEL, according to another exemplary embodiment of the first principal set of embodiments the present disclosure.
Figure 11:
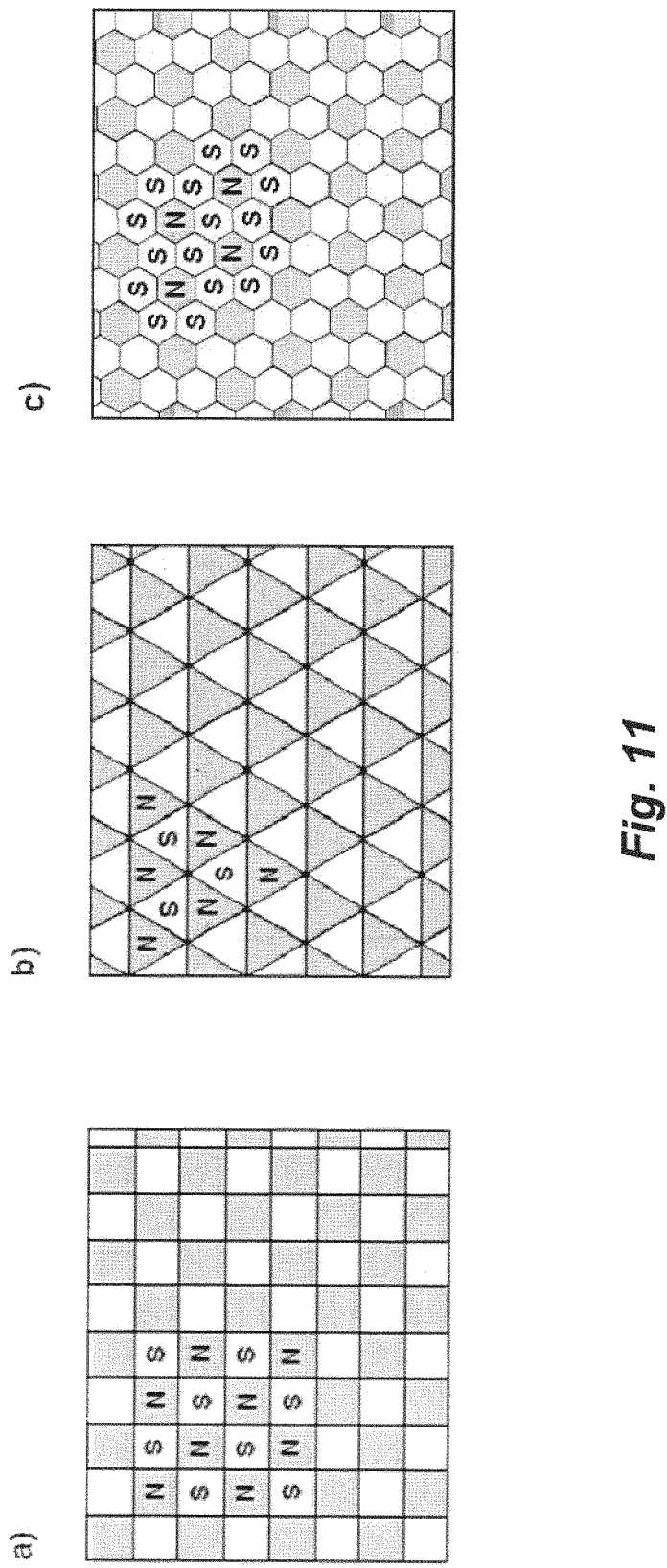
FIG. 11 schematically illustrates useful magnetization patterns for embodying the multi-pole magnetization of one or more of the magnetic plates) of a device according to some embodiments of the present disclosure.

An alternative exemplary embodiment of the device is explained with reference to FIG. 10. The magnetic plate MP herein has a two-dimensional multi-pole magnetization, which may be any surface-covering alternation of magnetic north and south poles, such as a square pattern (FIG. 11a), a rectangular pattern, a triangular pattern (FIG. 11b), a pattern derived from hexagonal symmetry (FIG. 11c) or any arbitrary regular or irregular tiling of a surface with alternating magnetic N/S poles. Otherwise, this embodiment is similar to that of FIG. 9.

Figure 12:
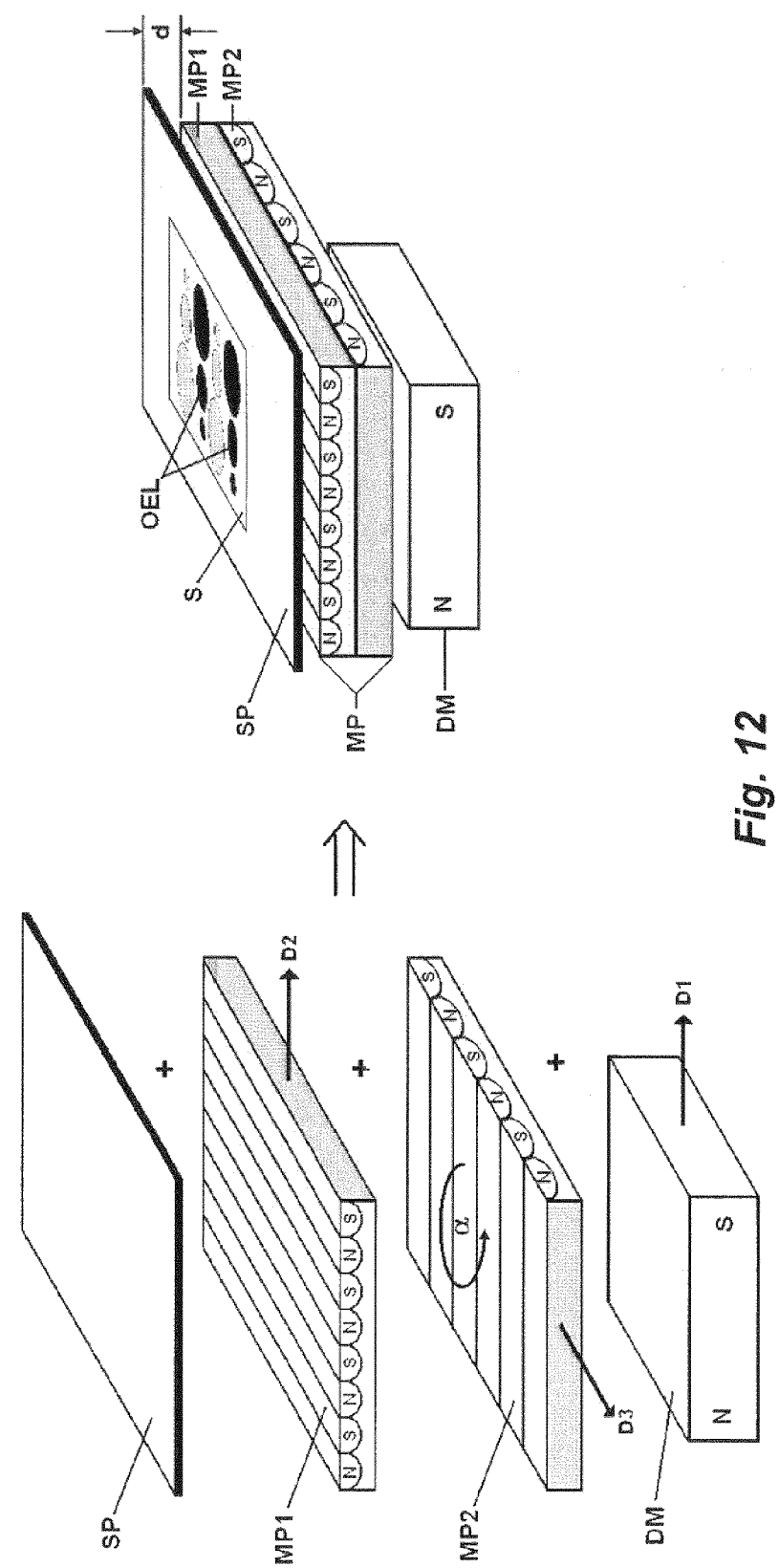
FIG. 12 schematically illustrates the structure of a device for producing an OEL, according to yet another exemplary embodiment of a first principal set of embodiments the present disclosure.

Still another alternative exemplary embodiment of the device is explained with reference to FIG. 12. The magnetic plate MP herein is embodied as a combination of first and second superposed magnetic plates MP1 respectively MP2, wherein the first magnetic plate MP1 has a 1-dimensional multi-pole magnetization with alternating magnetic polarity along a first direction D2, which may be equal to the direction D1 of the net magnetic axis between the effective North and the South pole of the first magnets (e.g., of the dipole magnet DM) in the plane of said first magnetic plate, and said second magnetic plate MP2 has a 1-dimensional multi-pole magnetization with alternating magnetic polarity along a second direction D3 in the plane of said second magnetic plate, and said first and said second plates are disposed substantially parallel to each other.

The rotation angle alpha $\alpha$ between the direction D2 of alternating magnetic polarity of said first plate MP1 and the direction D3 of alternating magnetic polarity of said second plate MP2 is not restricted and may correspond to the particular design needs.

Said first and second magnetic plates MP1 and MP2 are disposed with respect to each other such that the first plate MP1 is disposed with its extended surface tightly or at some distance, e.g. separated by a spacer, on the extended surface of the second plate MP2, such that their magnetic fields deploy a combined action at the location of the OEL.

Generally, in some embodiments said magnetic plate MP may be also be implemented as a combination of two or more magnetic plates MP1, MP2, . . . , MPi having individual 1-dimensional or 2-dimensional multi-pole magnetizations with alternate magnetic polarity across at least one extended surface of said magnetic plates. Said 1-dimensional multi-pole magnetization of said first and said second plates MP1, MP2, . . . , MPi may again be any stripe-wise alternation of magnetic north- and south-poles, such as a regular linear stripe pattern, a pattern of irregular linear stripes (FIG. 9a), or a pattern of curved stripes (FIG. 9b) or of arbitrarily-shaped stripes, or may furthermore also be circular patterns (FIG. 9c) elliptic patterns, or, more generally, any closed-loop patterns. The required multi-pole magnetization may further be present only at a single (e.g. the upper) surface of said magnetic plates MP, MP1, MP2, . . . , MPi, or it may run across the entire thickness of the plates MP, MP1, MP2, . . . , MPi, appearing with equal strength on both, the upper and the lower surfaces of the plates MP, MP1, MP2, . . . , MPi.

The dipole magnet DM may be oriented such that its north-south direction D1, defining said first direction x of the OEL, is substantially parallel to the plane of said magnetic plate MP or said combined magnetic plates MP1, MP2, . . . , MPi. In turn, the individual magnetic plates MP1, MP2, . . . , MPi may be substantially parallel to each other.

In a second set of principal embodiments of the device of the disclosure, described below with reference to FIGS. 13, 14 and 15, the magnet arrangement of one or more magnets comprises a magnetized magnetic plate MP containing a plurality of individual magnet elements ME configured to produce together the first magnetic field component, as well as to generate a superposition of individual local dipole-like magnetic fields as the second magnetic field component. Thus, in the second set of principal embodiments, the two magnetic field components are generated together, i.e. by the same magnets.

The magnetized magnetic plate MP contains or consists of a plurality of individual magnet elements which are disposed within the magnetic plate MP along at least one direction within the magnetic plate, the direction being substantially parallel to said first direction, and which have their magnetic axes, i.e. their north-south directions, substantially in the plane of the magnetic plate and are separated from their respective neighboring magnet elements by gaps. The gaps generate a superposition of individual local dipole-like magnetic fields, corresponding to an alternation of magnetic North and South poles along a first direction D1, as the second, alternating field component. The magnetic elements together also produce said first, monotonous magnetic field component along said first direction, which implies that their magnetic axes are not oriented at random in the plane of the magnetic plate, but oriented so as to jointly produce the magnetic overall field of the plate.

In preferred variant the individual magnets are also arranged within the magnetized magnetic plate MP along a second direction within the magnetized magnetic plate MP. The second direction is different from the first direction and such that also along the second direction each individual magnet is separated from its respective neighboring individual magnets by a gap and the individual magnets have their magnetic axes oriented so as to produce the magnetic overall field of the plate. In some embodiments this arrangement shows an analogy to a "check board" where only the black (or alternatively the white) fields carry the magnetic elements, while the white fields (respectively the black fields) represent the gaps.

Except for these differences, the embodiments of the second set of principal embodiments are similar to the first set of principal embodiments and accordingly the respective portions of the description relating to the first set of principal embodiments, which are not strictly based on these differences also apply to the second set of principal embodiments.

An example of the second set of principal embodiments is now described in more detail with reference to FIGS. 13, 14 and 15.

Figure 13:
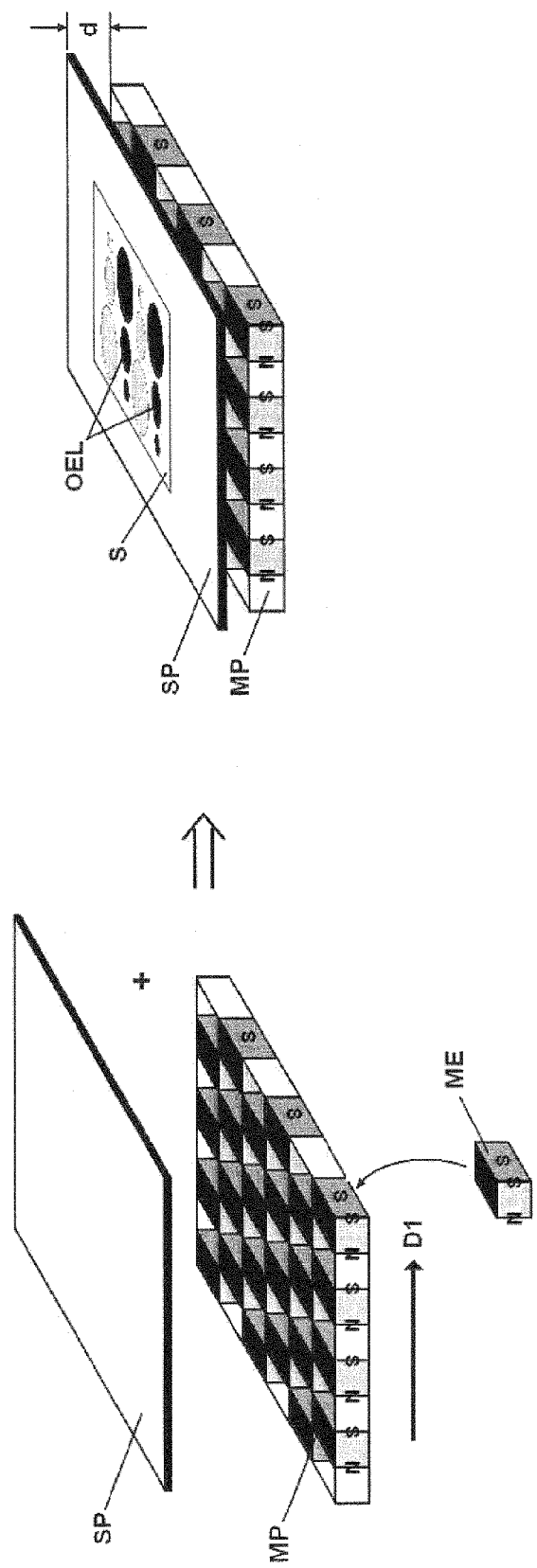
FIG. 13 schematically illustrates the exemplary structure of a device for producing an OEL, according to a second principal set of exemplary embodiments of the present disclosure.

FIG. 13 shows a device where the magnetic plate MP itself is laid out such as to additionally assume the function of the dipole magnet DM. In such embodiment, a number of magnet elements ME, preferably being permanent-magnetic, make up the plane of said magnetic plate MP, and are disposed and fixed such as to i) result in interstices (magnetic gaps) between alternating magnetic north and south poles, and to ii) result in an overall net dipole field of the magnetic plate in a direction D1 which is substantially parallel to the plane of said magnetic plate MP. Said interstices (magnetic gaps) may be empty spaces. The magnet elements ME may be fixed onto a nonmagnetic base plate. Alternatively, said interstices (magnetic gaps) may be filled with nonmagnetic material. In both cases this has the advantage of resulting in a mechanically more solid construction. Preferably, the ratio of the size of a gap and the size of a magnet element ME is at least 0.1.

Figure 14:
FIG. 14 schematically illustrates a longitudinal cross-section through the magnetic plate of the device of FIG. 13.

FIG. 14 schematically depicts a longitudinal section through an exemplary embodiment of such magnetic plate with the north poles N and the south poles S identified.

Figure 15:
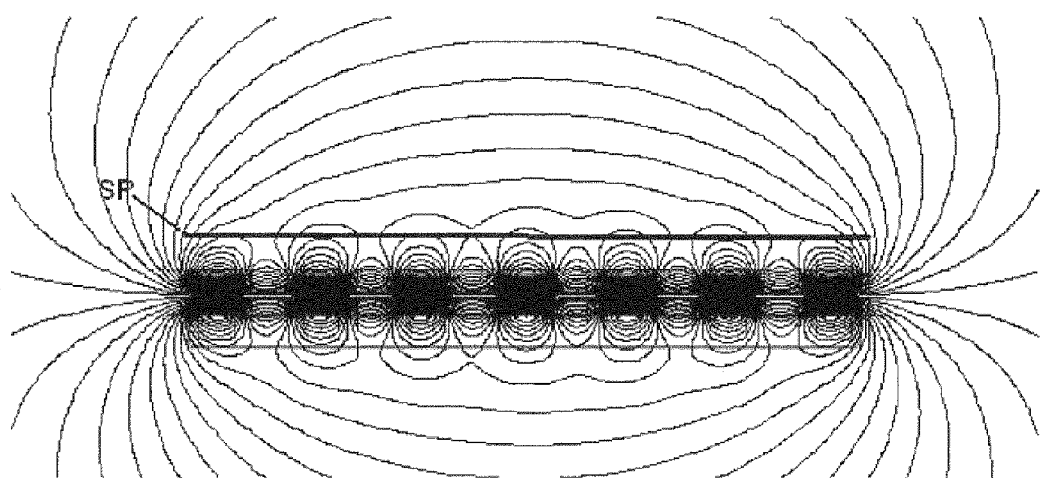
FIG. 15 shows the corresponding calculated magnetic field generated by the device of FIG. 13.

FIG. 15 shows the corresponding calculated magnetic field. At the location of a schematically drawn two-dimensional area, here embodied by an optional supporting plate SP, the elevation angle of the magnetic field lines with respect to the plane of the supporting plate SP and along the depicted section of the supporting plate SP is the sum of a first function $\theta_1$ as described above, which may be monotonously decreasing, as the principal component (i.e. the effect of the macroscopic dipole field along direction D1) and an alternating function $\theta_2$ as the auxiliary component (i.e. the effect of the magnetic gaps), reflecting thus the conditions described above with reference to and depicted in FIG. 6.

The following explanations are again generally applicable and are thus not specific to the first or second principal embodiments:

The magnetic plate MP, respectively the combined magnetic plates MP1, MP2, . . . MPi are preferably more extended than the OEL to be produced, in order to avoid border effects due to the deviation of the magnetic fields at the plate borders.

Any one of the magnets of the magnet arrangement, including said magnetic plate MP, respectively in the case of the first set of principal embodiments said combined magnetic plates MP1, MP2, . . . , MPi, as well as any one of the first magnets, e.g. said dipole magnet DM, may further comprise a permanent magnet, an electromagnet, or a combination thereof. Permanent magnets have the advantage of fixed magnetic fields, which allows assembling and adjusting the orienting device in a one for all way for the ease of use. Electromagnets have the advantage of allowing for variable magnetic fields and pole reversal, which is useful in more flexible operation, where more than one different effect coating must be realized using one and the same device. Thus, to allow for flexible operation, one or several of the magnets of the device may be embodied as electromagnets. Electromagnets are embodied as iron yokes having the required form and magnetic poles, and carrying appropriate wire windings, usually of insulated copper- or aluminum wire ("magnet wire"), wherein an electric current can be launched to produce a corresponding magnetic field.

Figure 16:
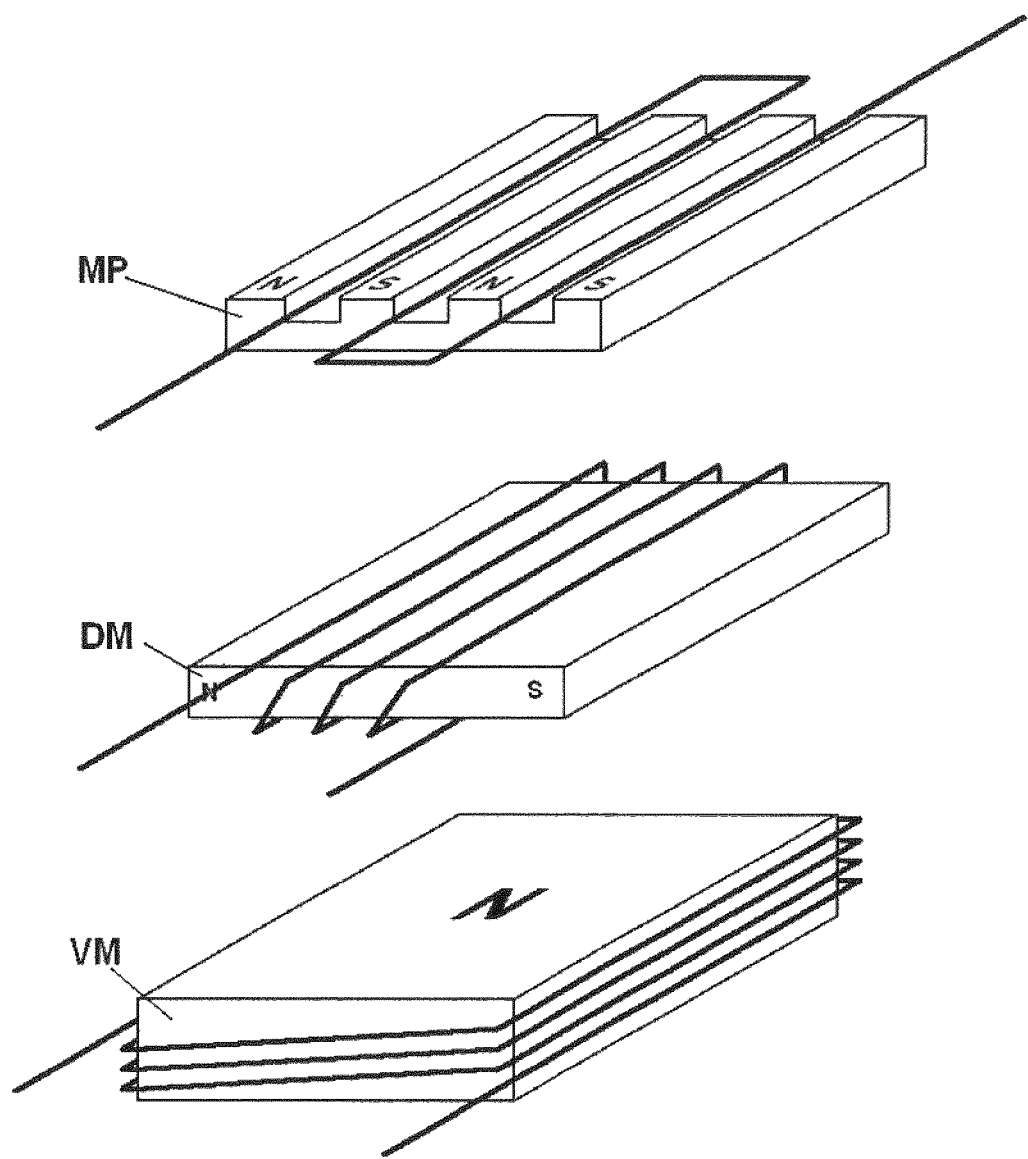
FIGS. 16-18 schematically illustrate various exemplary electromagnets, which may be used as part of the magnet arrangements of devices for producing an OEL, according to various embodiments of the present disclosure.
Figure 17:
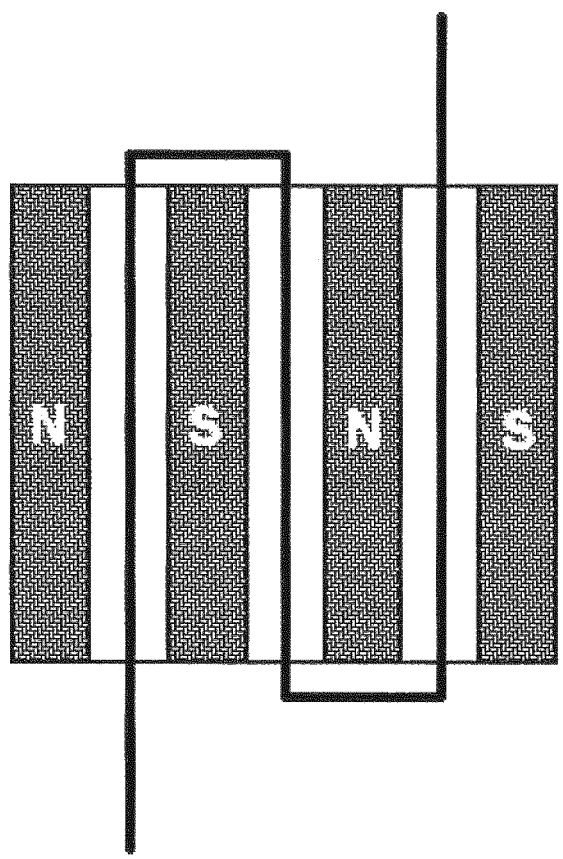
Figure 18:
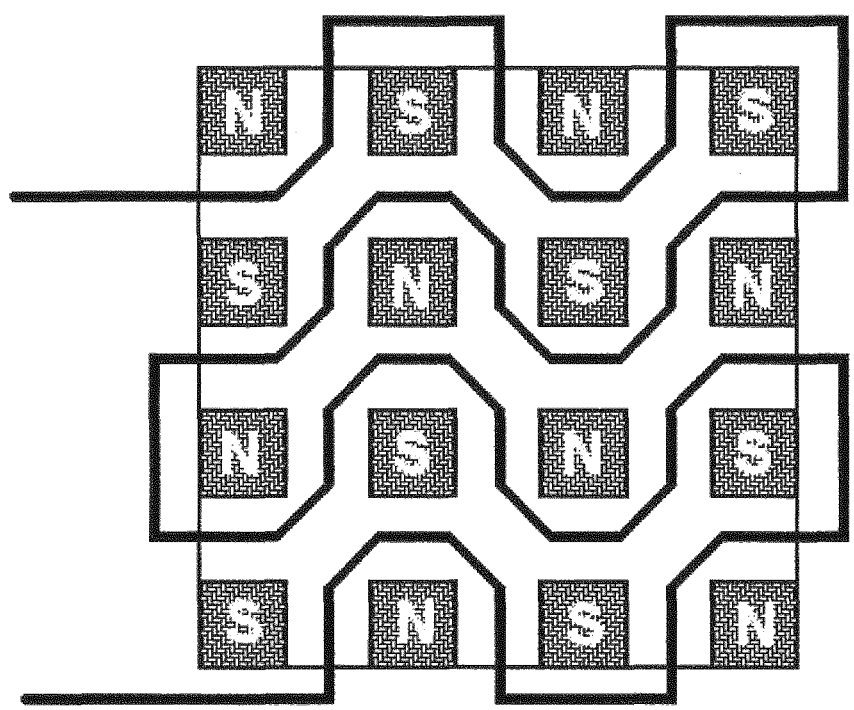

For example in the embodiments of FIGS. 16, 17 and 18, either the magnetic plate MP, or the dipole magnet DM, or still an additional vertical magnet VM, or any combination thereof, can be embodied as electromagnets to allow for variable magnetic fields (cf. FIG. 16). FIG. 17 and FIG. 18 schematically illustrate exemplary embodiments of iron yokes with magnetic poles and wire windings for a 1-dimensional multi-pole magnetic plate and a 2-dimensional multi-pole magnetic plate, respectively. It is further possible to embody devices for still more differentiated variable magnetic fields, wherein each pole of the iron yoke is provided with its own individual winding. In case of permanent magnets, any kind of permanent-magnetic material can be used to embody the magnets, e.g. in related embodiments described above the magnetic plates MP, MP1, MP2, . . . , MPi and the dipole magnet DM. The permanent magnets may be, e.g., of Alnico, barium- or strontium-hexaferrite, cobalt alloys, or rare-earth-iron alloys, such as neodymium-iron-boron alloy. Particularly preferred are, however, the easily workable magnetic composite materials, which comprise a permanent-magnetic filler, such as strontium hexaferrite ($SrFe_{12}O_{19}$) or neodymium-iron-boron ($Nd_2Fe_{14}B$) powder, in a plastic- or rubber-type matrix. Such materials have been described in the art as "Plastoferrites".

Figure 19:
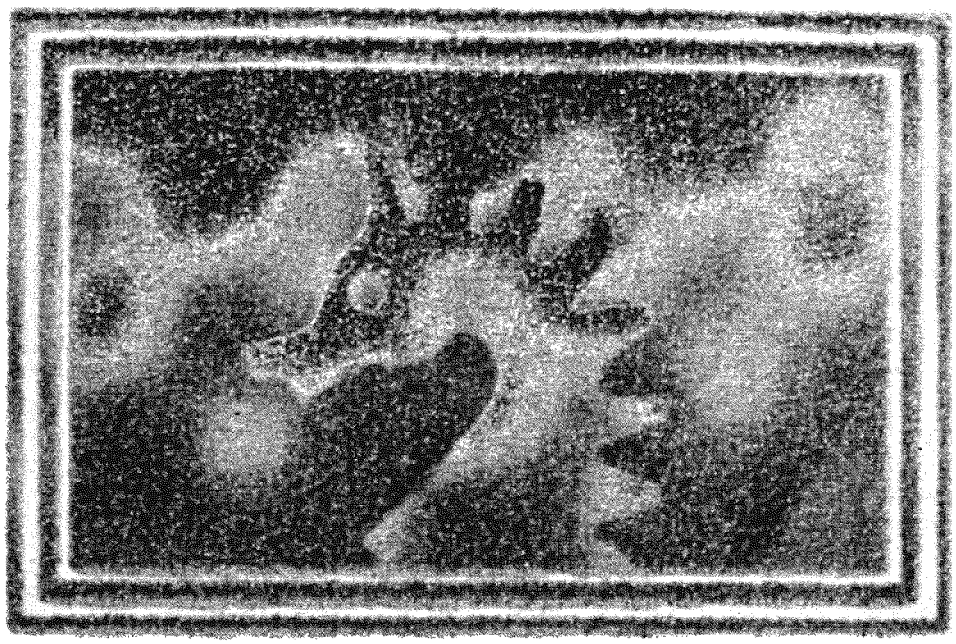
FIG. 19 depicts a photo of an optical effect coating achieved by additionally using an engraved permanent-magnetic supporting plate in the orientation of particles within an OEL, according to embodiments of the present disclosure.

The magnetic plate MP, respectively the combined magnetic plates MP1, MP2, . . . , MPi may furthermore carry surface relief, engravings or cut-outs on their respective surfaces, thus causing a further modulation of the first magnetic component, e.g. of the dipole magnet DM in some embodiments, which has an effect of the image provided by the OEL to be produced and additionally and simultaneously allows transferring of graphic indicia into the OEL, as shown in Example 2 described below and in FIG. 19.

As a general principle, for all embodiments of the present disclosure, the distance d between the location of the OEL, e.g. the location of the two-dimensional area, and the magnetic arrangement is preferably chosen so as to obtain a proper balance of the first magnetic field component, corresponding to the first function $\theta_1$, and the alternating modulation due to the second magnetic field component corresponding to the second function $\theta_2(x)$. On the one hand, for a small distance d, the alternating second magnetic field component may dominate and the macroscopic first magnetic field component may be rather negligible in comparison. On the other hand, for a large distance d, the alternating second magnetic field component may become negligible, and the macroscopic first magnetic field component may dominate (which yields an effect similar to a pure "rolling bar" effect). Thus, in preferred embodiments of the present disclosure, a distance d is selected, where both the first and the second magnetic field components are present at appropriate strengths at the position of the OEL when the particles are oriented, in order to achieve an optimized desired optical effect of the OEL.

For similar reasons, preferably the ratio of (i) the length of the magnetized magnetic plate MP measured along a direction being parallel to said first direction, and (ii) said distance d, exceeds a value of 5.0.

The device may further comprise a support having a surface for supporting the binder material during orientation of the magnetic or magnetizable particles therein such that the orientation region is defined as the space adjacent a surface of the support. Particularly, the support may be a plate or rotary unit of a printing apparatus. Alternatively, the support may be a separate component of the device such as a separate plate for carrying the OEL within the orientation region or in its vicinity. In a further variant, the support may comprise a component for generating an air cushion which supports the OEL within the orientation region. In an embodiment of the disclosure the supporting plate SP comprises a magnetic material, in particular of permanent-magnetic material, preferably of an easily workable magnetic composite, "plastoferrite"-type material, comprising a permanent-magnetic filler, such as strontium hexaferrite ($SrFe_{12}O_{19}$) or neodymium-iron-boron ($Nd_2Fe_{14}B$) powder, in a plastic- or rubber-type matrix. Particularly, in a preferred embodiment of this variant, the supporting plate SP of magnetic material may be permanently magnetized and may carry indicia in the form of surface relief, engravings, or cut-outs. Like in the case of the magnetized magnetic plate carrying indicia, (as described above) this embodiment additionally and simultaneously allows transferring of graphic indicia into the OEL, as shown in Example 2 described below and in FIG. 19.

In some preferred embodiments of the device, the magnet arrangement may be generally configured as a component of a printing apparatus. Particularly, the magnet arrangement may be configured as an insert being adapted for being inserted into a recess within a plate or a rotating unit of a printing apparatus. The orienting region may then be defined, at least partially, as the space adjacent the outer surface of the plate or rotating unit or it may be defined as a region at a given distance from said surface. In some specific embodiments the magnet arrangement is particularly adapted to be inserted into the recess of the plate or the cylindrical rotating unit of a printing apparatus such that when it is inserted its remaining outer surface is aligned with the surface of the plate respectively the surface of the rotating unit. In such case, the magnetic plate MP or the combined magnetic plates MP1, MP2, . . . , MPi, as well as an optional supporting plate SP, are correspondingly designed and adapted to the cylindrical surface of the rotating unit in order to assure a good contact with the substrate.

Figure 20:
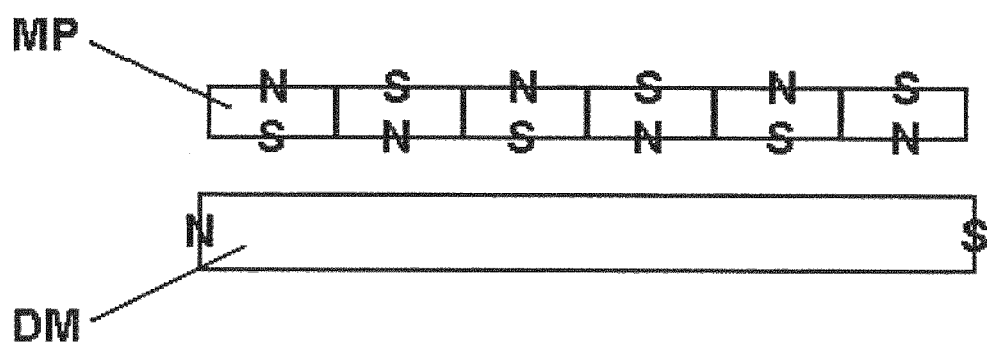
FIG. 20 schematically illustrates a specific exemplary magnet arrangement for embodying the present disclosure according to another exemplary embodiment of a first principal set of embodiments.
Figure 21:
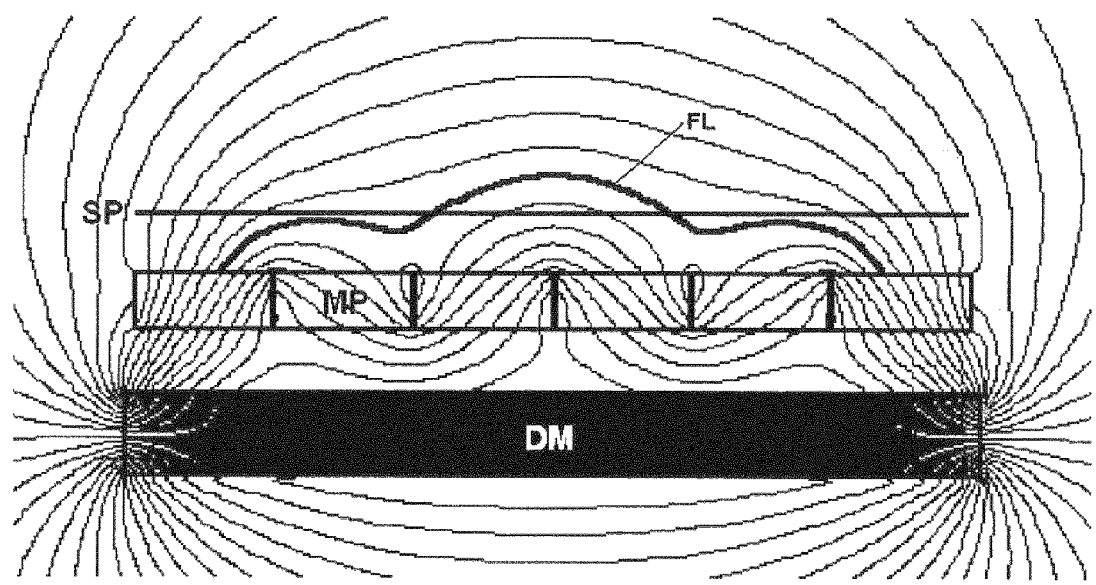
FIG. 21 shows the calculated magnetic field lines of the arrangement of magnets of FIG. 20. The magnetic pole designations are omitted here.
Figure 22:
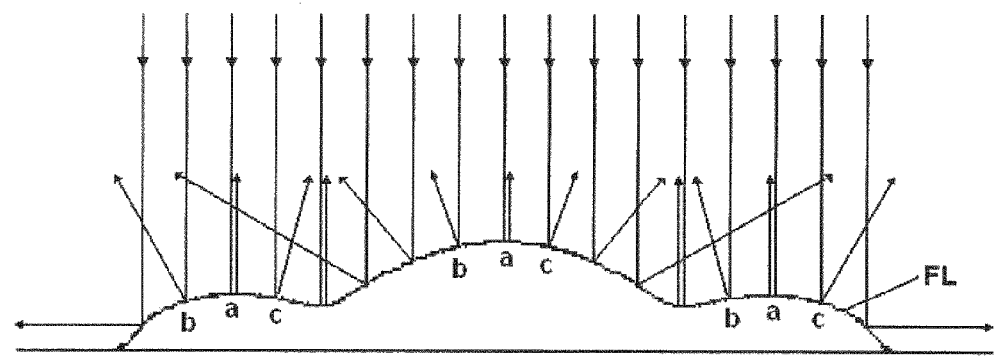
FIG. 22 schematically illustrates the platelet-shaped pigment particles (pigment flake) orientation along the magnetic field lines resulting from the magnet arrangement of FIG. 20 at the location of the supporting plate (SP) (FIG. 22 b)), and the corresponding reflection of incoming light at the oriented platelet-shaped pigment particles (FIG. 22 a)).
Figure 22:
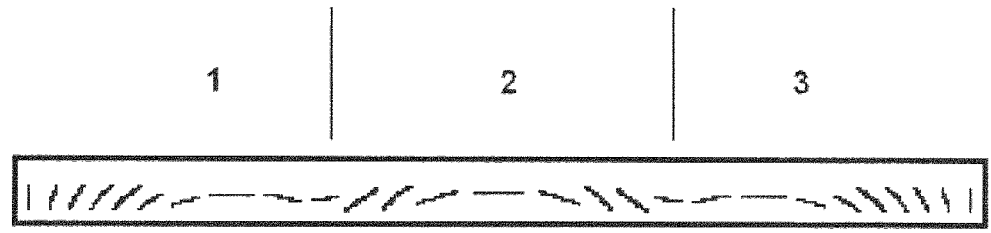

Finally, referring to FIGS. 20 to 22 and for the purpose of illustration again to the first set of principal embodiments and, the working principle of the combination of a multi-pole magnetic plate MP with a dipole magnet DM is corroborated by a calculation of the magnetic field of a device according to such embodiments of the present disclosure, using the program Vizimag 2.5 (J. Beeteson, 2003). The magnet arrangement used in the calculation is shown in FIG. 20. In this example, the magnetic plate MP is composed of six parallel arranged magnets of relative strength 20, with alternating north and south poles in vertical direction. A dipole magnet DM, horizontally arranged under the magnetic plate MP, has a relative strength of 100. The calculated magnetic field pattern based on this magnet arrangement is depicted in FIG. 21. The evolution of the magnetic field vector across the supporting plate SP is approximately given by the field line FL drawn in bold. FIG. 22a depicts the specular reflection of vertically incident light at plate-like particles which are aligned along said field line FL drawn in bold. FIG. 22b depicts a pigment flake orientation pattern in an OEL corresponding to said field line FL drawn in bold.

Referring now to FIG. 22a, it can be seen that:
i) within each of the zones "1", "2", "3", the positions of specular reflection, i.e. the bright parts of the image, appear to move with changing viewing angle: looking from the top at the image, the positions marked with "a" are in specular reflection condition; changing the viewing angle now to top-left, the positions marked with "b" are in specular reflection condition, i.e. the bright parts of the image appear to move to the left. Similarly, changing the viewing angle to top-right, the positions marked with "c" are in specular reflection condition, i.e. the bright parts of the image appear to move to the right.

ii) The apparent movement of bright zones with changing viewing angles inverts direction upon looking from the other side, i.e. for coatings obtained by applying the magnetic orienting device from the top instead from the bottom, and for coating on a transparent substrate, allowing looking at them from the recto and from the verso side.

iii) Some zones "disappear" completely from view at a limiting viewing angle: Zone "1" appears bright at viewing angles ranging from left-side grazing view to about orthogonal view (position "c" of zone 1), but appears dark ("disappears") at lower right-side viewing-angles, because there are no pigment flakes in specular reflection condition any more at said lower viewing angles for zone "1". Zone "2" appears bright at viewing angles ranging from about 30° left-side view to about 30° right-side view, and "disappears" at grazing view at either side. Zone "3" appears bright at viewing angles ranging from right-side grazing view to about orthogonal view, and "disappears" at lower left-side viewing-angles.

III. Method for Producing an OEL

The present disclosure further discloses a method for producing an OEL and an OEL obtainable therefrom. The method of producing an optical effect layer, comprises the step of exposing a fluid binder material, being at least partially transparent to electromagnetic radiation of one or more wavelengths in the range of 200 nm to 2500 nm and comprising a plurality of magnetic or magnetizable non-spherical particles having a non-isotropic reflectivity and being dispersed within said binder material, i.e. an OEL as described in section I above, to the magnetic field of a device as described in section II above. The OEL is exposed in said region adjacent to an extended surface of the magnetized magnetic plate MP of the device, hereby orienting the magnetic or magnetizable non-spherical particles within the binder material. The method further comprises a step of concomitantly or subsequently hardening the binder material so as to fix the magnetic or magnetizable non-spherical particles in their adopted positions and orientations.

During the exposing to the combined magnetic field of the orienting device, the OEL is preferably held at a distance d from the magnetic plate MP of the orienting device. The distance d may be particularly in the range between 0.1 to 5 millimeters.

The binder material is preferably hardened by radiation-curing, which has the advantage of producing an instantaneous increase in viscosity of the coating composition after exposure to the curing radiation, thus preventing any further movement of the particles and in consequence any loss of information after the magnetic orientation step.

Preferred is radiation-curing by photo-polymerization, under the influence of actinic light having a wavelength component in the UV or blue part of the electromagnetic spectrum (typically 300 nm to 550 nm; most preferred 380 nm to 420 nm; "UV-visible-curing"). The binder material for UV-visible-curing must be correspondingly formulated, comprising at least one photo initiator. Equipment for UV-visible-curing may comprise a high-power light-emitting-diode (LED) lamp such as obtainable from PHOSEON Technology, or an arc discharge lamp, such as a medium-pressure mercury arc (MPMA) or a metal-vapor arc lamp, as the source of the actinic radiation.

In the case of an OEC comprising a substrate and at least one OEL, the magnetic field of the orienting device may further be applied either from the side of the substrate which carries the at least one OEL, or from the side of the substrate opposite to the OEL. Preferably, the substrate S is disposed on a supporting plate SP of the device during the orientation of the particles within the OEL.

In a particular embodiment of the method, the arrangement of magnets, or at least the portion thereof generating the first magnetic field component, is rotated in a plane substantially parallel to the OEL and/or to the plane of the magnetized magnetic plate MP of the device during the orienting step, so as to produce an at least roughly circularly averaged magnetic field. The so obtained OEL has substantially no preferred direction, but shows the effect of the disclosure along any direction, under an arbitrary axis of tilt in the plane of the OEL.

In a particular embodiment of the method in the case of an OEC, the substrate is a transparent substrate enabling a viewing of the OEL from both, the recto- and the verso-side. The OEL of the present disclosure has noteworthy particularity that the sense of its apparent motion with changing viewing angle reverses if seen from the recto- or from the verso-side, respectively. Whereas dark image elements apparently progress with increasing viewing angle on the recto-side of the OEL, these dark image elements apparently regress with increasing viewing angle on the verso-side of the same OEL.

According to yet another embodiment of the process, at least a first and a second OEL are combined on a same surface of a substrate S, the first OEL being oriented and cured by applying the magnetic field of the above-described orienting device of the present disclosure from the side of the substrate which carries the OEL (recto side), and the second OEL being oriented and cured by applying the magnetic field of said same determined device from the side of the substrate opposite to the OEL (verso side), wherein said first direction dir1 within the extended surface of the first OEL and the second OEL, is the same in said first and said second application.

In a further variant of the above embodiment, said first and said second OELs are disposed at least in part on top of each other. When viewed such that the direction of the OELs corresponding to said first direction, e.g. direction D1 of a dipole magnet DM generating the first magnetic field component of the combined magnetic field of the orienting device, is along the line between the two eyes of the observer, the combined OELs exhibit a 3-dimensional depth effect, which is useful as a security element or as a decorative feature.

Still further variants of the above embodiment are obtained if said first directions D1 are different in said first and said second application of the device, or if a first device is used in said first application, and a second, different device in said second application.

It is also possible to provide one or more further coatings or layers on the surface of said OEL or on the substrate of an OEC or on parts of same. In the case of an OEC the further coatings or layers may be added either prior to or subsequently to the application of the OEL of the present disclosure to the substrate. In particular, a primer layer may be applied to the substrate prior to the OEL of the present disclosure, in order to enhance the quality of a magnetically transferred pigment orientation image or to promote adhesion, and/or a protective coating may be applied over the OEL of the present disclosure, serving, e.g. to increase its wear and soil resistance or to improve its optical appearance, e.g. to make it glossy or mat depending on the particular needs.

In still a further embodiment, the OEL is produced in the form of a transfer foil, which can be applied to a document or to an article in a separate transfer step. To this aim, the substrate is provided with a release coating, on which an optical effect coating OEL is produced as hereinbefore described. An adhesive layer may be applied over the so produced OEL.

An OEL according to the disclosure may for example be used for decorative purposes, as well as for protecting and authenticating a security document, such as a banknote, a value document, an identity document, and access document, a financial transaction card, a transportation ticket or a product label. Accordingly, a decorative object or a security document may carry an OEL according to the present disclosure.

IV. Specific Exemplary Embodiments

The disclosure is now further illustrated with the help of two specific exemplary embodiments:

Example 1

An exemplary device according to the present disclosure is composed of:
- a polymeric holder with a convex upper surface (50×50 mm), cylindrically curved about an axis D2 (surface curvature diameter: 275 mm), the lower surface of the holder being flat and the maximum thickness of the holder in its center measuring 2.7 mm;
- a grouped dipole magnet DM (30×30×6 mm), magnetized through the 30-mm thickness, located in contact with the flat lower surface of the holder, the axis of magnetization of the dipole magnet DM being along a direction D1 parallel to the lower surface of said holder and perpendicular to the cylindrical axis D2 of the curved upper surface of the holder;
- a flexible composite magnetic plate MP2 (NdFeB in polymeric binder; 40×40 mm, thickness 1.5 mm) located on top of and parallel to said convex upper convex surface of said polymeric holder, said magnetic plate MP2 being magnetized though its thickness with a succession of alternating N and S magnetic pole stripes along the axial direction D2. The alternation of N and S pole stripes pointing out of the surface of MP2 forms a repetitive structure with a periodicity of 6 mm along direction D2.
- a flexible rubber-bonded ferrite composite magnetic plate MP1 ($SrFe_{12}O_{19}$ in nitrile rubber, 40×40 mm, 1.5 mm thick) placed in contact with and directly on top of said magnetic plate MP2. Said plate MP1 is magnetized through its 1.5 mm thickness with a repetitive succession of alternating N and S pole stripes along a direction essentially parallel to an axis D1 parallel to D3. D1 forms an angle alpha of 90 degrees with D2 and an angle of 0 degrees with D3. The alternation of N at S pole stripes pointing out of the surface of MP1 forms a repetitive structure with a periodicity of 6 mm along the perimeter of the curved surface of MP1.
- a rubber-bonded flexible composite magnetic supporting plate (SP) ($SrFe_{12}O_{19}$ in nitrile rubber, 40×40 mm, 1 mm thickness) located directly in contact with magnetic plate MP1 and uniformly magnetized through its 1 mm thick surface, with a single N-pole pointing radially towards magnetic plate MP1.

A solid rectangular area (17×27 mm) was printed on the obverse surface of a paper substrate using a silkscreen UV-curing coating composition according to WO 2007/131833 A1. The imprinted paper substrate was brought into contact with the device while the ink was still "wet", with the reverse of the substrate facing the surface of the supporting plate SP. Contact was maintained between the imprinted paper and the device for about 1 second, to allow for the orientation of the magnetic particles contained in the printed coating composition. The substrate carrying the oriented coating composition was subsequently removed from the device and the coating composition was cured by UV-irradiation to produce a solid coating containing oriented optically-variable particles. FIG. 7 depicts the resulting visual effect when the print is tilted backward a)-d) and forward e)-h).

Example 2

The device described in example 1 is modified by rotating the grouped dipole magnet DM about its major axis normal to the surface so as to form an angle of +45° between D3 and D2, and an angle of −45° with D1, and the surface of the magnetic supporting plate SP was engraved with the image of a seahorse (engraving depth: 0.5 mm).

A solid rectangular area (17×27 mm) surrounded with two decorative borders was printed on the obverse surface of a paper substrate using a silkscreen UV-curing coating composition according to WO 2007/131833 A1. The imprinted paper substrate was brought into contact with the modified device of Example 2 while the ink was still "wet", with the reverse of the substrate facing the surface of the supporting plate (SP). Contact was maintained between the imprinted paper and the device for about 1 second to allow for the orientation of the magnetic particles contained in the printed coating composition. The substrate carrying the oriented coating composition was subsequently removed from the device and the coating composition was cured by UV-irradiation to produce a solid coating containing oriented optically-variable particles.

The resulting solid coating containing oriented particles exhibits a strongly dynamic and color-shifting pattern in function of the viewing angle, in combination with a distinct image of the engraved seahorse as shown in FIG. 19. This example illustrates the combination of a color shifting dynamic geometric pattern produced by the combination of magnets (DM, MP1, MP2) with essentially static indicia produced by the engraved magnetic supporting plate SP.

The invention claimed is:
1. Optical effect layer (OEL) comprising:
   - a binder material being at least partially transparent to electromagnetic radiation of one or more wavelengths in a range of 200 nm to 2500 nm; and
   - a plurality of non-spherical particles having a non-isotropic reflectivity dispersed within said binder material and oriented according to a pattern extending over a length along a first direction (x) within an extended surface of the optical effect layer, wherein in a first cross-section of said optical effect layer substantially perpendicular to said extended surface and along said first direction (x), the local average of an angle between:

(i) a straight line along an observed longest dimension within the corresponding cross-section shape of those non-spherical particles that intersect with said first cross-section; and (ii) said first direction (x)

varies according to a function ($\theta$) of a position (P) along said first direction (x), wherein the function is the sum of a monotonically increasing or decreasing first function ($\theta_1$) of said position (P) and an alternating second function ($\theta_2$) of said position (P) such that, if the viewing angle of the optical effect layer changes, a pattern of bright areas and dark areas on the extended surface of the optical effect layer will appear to move along the first direction (x).

2. Optical effect layer according to claim 1, wherein the range is of the visible spectrum between 400 nm and 700 nm.

3. Optical effect layer according to claim 1, wherein the optical effect layer (OEL) is disposed on a substrate to form an optical effect coating (OEC) comprising the substrate and the optical effect layer (OEL).

4. Optical effect layer according to claim 1, wherein said non-spherical particles comprise a magnetic or magnetizable material.

5. Optical effect layer according to claim 1, wherein said non-spherical particles are selected from the group consisting of platelet-shaped particles, needle-shaped particles, and mixtures thereof.

6. Optical effect layer according to claim 1, wherein said non-spherical particles are optically variable magnetic particles.

7. Optical effect layer according to claim 6, wherein said non-spherical optically variable magnetic particles comprise a thin-film Fabry-Perot interference stack.

8. Optical effect layer according to claim 1, wherein the values of said monotonically increasing or decreasing first function ($\theta_1$) span a difference of at least 30 degrees over said length.

9. Optical effect layer according to claim 1, wherein in a second cross-section of said optical effect layer (OEL) substantially perpendicular to said extended surface and along a second direction (y) within the extended surface, which is different from the first direction (x), the local average angle between:

(i) a straight line along an observed longest dimension within the corresponding cross-section shape of those non-spherical particles that intersect with said second cross-section; and (ii) said second direction (y)

varies according to a third function ($\theta_3$) of a position along said second direction (y), which function ($\theta_3$) is an alternating function of said position along said second direction (y).

10. Optical effect layer according to claim 1, wherein, in a second cross-section of said optical effect layer (OEL) substantially perpendicular to said extended surface and along a second direction (y) within the extended surface, which is different from the first direction (x), the local average angle between:

(i) a straight line along an observed longest dimension within the corresponding cross-section shape of those non-spherical particles that intersect with said second cross-section; and (ii) said second direction (y)

varies according to a fourth function ($\theta_4$) of a position along said second direction (y), which fourth function ($\theta_4$) is the sum of a function being equal to said first function ($\theta_1$) of said position along said second direction (y) and an alternating fifth function ($\theta_5$) of said position along said second direction (y).

11. Optical effect layer according to claim 1, wherein, the optical effect layer (OEL) comprises, in addition to said plurality of non-spherical particles, at least one of:
non-color-shifting magnetic particles;
colorless magnetic particles;
color-shifting non-magnetic particles;
non-color-shifting non-magnetic particles; and
colorless non-magnetic particles.

12. Device for producing the optical effect layer (OEL) of claim 1, by orienting magnetic or magnetizable particles dispersed within a binder material, the device comprising:
an arrangement of one or more magnets comprising one or more first magnets and a magnetized magnetic plate configured to produce a combined magnetic field, the combined magnetic field comprising:
a) a first magnetic field component being substantially similar to a magnetic dipole field and having its North-South direction aligned substantially parallel to said magnetized magnetic plate; and
b) a second magnetic field component comprising a superposition of individual local dipole-like magnetic fields and thus corresponds to an alternation of magnetic North and South poles along a first direction substantially parallel to said North-South direction;
wherein the first magnetic field component and the second magnetic field component overlap at least in a region adjacent to an extended surface of said magnetized magnetic plate,
the one or more first magnets being arranged for orienting magnetic or magnetizable particles within the optical effect layer according to a principal component $\theta_1$ of an orientation function $\theta$, the magnetized magnetic plate being arranged for orienting the magnetic or magnetizable particles within the optical effect layer according to an auxiliary component $\theta_2$ of the orientation function $\theta$,
the orientation function $\theta$ being a function of a position (P) along a first direction (x), the principal component $\theta_1$ being a monotonically increasing or decreasing first function of position, the auxiliary component $\theta_2$ being an alternating second function of position,
wherein the achieved respective orientation of the particles coincides, at least on average, with the local direction of the magnetic field lines at the positions of the particles, the device being adapted to produce said optical effect layer.

13. Device according to claim 12, wherein the arrangement of one or more magnets comprises:
one or more magnets configured to produce the first magnetic field component; and
a magnetized magnetic plate configured to produce the second magnetic field component.

14. Device according to claim 13, wherein said one or more magnets configured to produce the first magnetic field component comprise a dipole magnet having its North-South direction substantially aligned parallel to said magnetized magnetic plate.

15. Device according to claim 13, wherein at least one of said one or more magnets configured to produce the first magnetic field component is mounted so as to be rotatable in a plane substantially parallel to the plane of said magnetized magnetic plate.

16. Device according to claim 12, wherein the arrangement of one or more magnets comprises a magnetized magnetic plate containing a plurality of individual magnet elements arranged within the magnetized magnetic plate and along at least one dimension of the magnetized magnetic plate, the dimension being substantially parallel to said first direction, such that along said dimension, the magnet elements:
- form a row,
- are separated from their respective neighboring magnet elements by a gap, and
- have their respective magnetic axis' substantially aligned and pointing in a same alignment direction;
wherein said magnetized magnetic plate containing said magnet elements is thus configured to produce the combined magnetic field comprising both the first and the second magnetic field components.

17. Device according to claim 16, wherein the magnetized magnetic plate comprises further magnet elements arranged along a second dimension of the magnetized magnetic plate, the second dimension being different from the first dimension, such that also along the second dimension, the magnet elements are separated from their respective neighboring magnet elements by a second gap and have their respective magnetic axis' substantially aligned and pointing in said alignment direction.

18. Device according to claim 16, wherein a ratio of the size of the gap to the size of the magnet element is at least 0.1.

19. Device according to claim 12, wherein said magnetized magnetic plate comprises two or more magnetic plates.

20. Device according to claim 12, wherein said magnetized magnetic plate comprises indicia in the form of surface relief, engravings, or cut-outs.

21. Device according to claim 12, further comprising a support to hold the optical effect layer at a distance (d) from said magnetized magnetic plate.

22. Device according to claim 21, wherein the ratio of:
(i) the length of the magnetized magnetic plate measured along a direction being parallel to said first direction; and
(ii) said distance (d)
exceeds a value of 5.0.

23. Device according to claim 21, wherein said support comprises a magnetized permanent magnetic material.

24. Device according to claim 23, wherein said support comprises indicia in the form of surface relief, engravings or cut-outs.

25. Device according to claim 12, wherein the device is configured as a component of a printing apparatus and adapted to be inserted into a recess of a printing plate or a rotating unit of the printing apparatus.

26. Method of producing an optical effect layer, the method comprising:
exposing a fluid binder material comprising a plurality of magnetic or magnetizable non-spherical particles having a non-isotropic reflectivity and being dispersed within said binder material, to the magnetic field of a device according to claim 12 in said region adjacent to an extended surface of the magnetized magnetic plate of the device, thereby orienting the magnetic or magnetizable non-spherical particles within the binder material; and
hardening the binder material so as to fix the magnetic or magnetizable non-spherical particles in their adopted positions and orientations,
wherein, at least in its hardened state, the binder material is at least partially transparent to electromagnetic radiation of one or more wavelengths in the range of 200 nm to 2500 nm.

27. Security document comprising an optical effect layer according to claim 1.

28. Use of an optical effect layer according to claim 1 as a security feature or security element in document security applications.

* * * * *